(12) United States Patent
Kersulec et al.

(10) Patent No.: US 12,205,473 B2
(45) Date of Patent: Jan. 21, 2025

(54) COLLISION AVOIDANCE SYSTEMS AND METHODS

(71) Applicant: FLIR Belgium BVBA, Meer (BE)

(72) Inventors: Jean-Luc Kersulec, Fareham (GB); Mark Johnson, Vannes (FR)

(73) Assignee: FLIR Belgium BVBA, Meer (BE)

( * ) Notice: Subject to any disclaimer, the term of this patent is extended or adjusted under 35 U.S.C. 154(b) by 559 days.

(21) Appl. No.: 17/155,048

(22) Filed: Jan. 21, 2021

(65) Prior Publication Data

US 2021/0166568 A1 Jun. 3, 2021

Related U.S. Application Data

(63) Continuation-in-part of application No. 16/533,598, filed on Aug. 6, 2019, now Pat. No. 11,505,292, and
(Continued)

(51) Int. Cl.
*G05D 1/00* (2024.01)
*B63B 43/18* (2006.01)
(Continued)

(52) U.S. Cl.
CPC ............... *G08G 3/02* (2013.01); *B63B 43/18* (2013.01); *B63B 49/00* (2013.01); *G05D 1/0206* (2013.01)

(58) Field of Classification Search
None
See application file for complete search history.

(56) References Cited

U.S. PATENT DOCUMENTS 2,968,957 A 1/1961 Condie et al.
3,140,436 A 7/1964 Hatch
(Continued)

FOREIGN PATENT DOCUMENTS

CN 101145200 A 3/2008
CN 102692225 9/2012
(Continued)

OTHER PUBLICATIONS

C. Fulgenzi, A. Spalanzani and C. Laugier, "Dynamic Obstacle Avoidance in uncertain environment combining PVOs and Occupancy Grid," Proceedings 2007 IEEE International Conference on Robotics and Automation, Rome, Italy, 2007, pp. 1610-1616, doi: 10.1109/ROBOT.2007.363554. (Year: 2007).*
(Continued)

*Primary Examiner* — Jelani A Smith
*Assistant Examiner* — Davin Seol
(74) *Attorney, Agent, or Firm* — Haynes and Boone, LLP

(57) ABSTRACT

Techniques are disclosed for systems and methods to provide navigation control and/or docking assist for mobile structures. A navigation control system includes a logic device, one or more sensors, one or more actuators/controllers, and modules to interface with users, sensors, actuators, and/or other modules of a mobile structure. The logic device is configured to receive navigation control parameters from a user interface for the mobile structure and perimeter sensor data from a perimeter ranging system mounted to the mobile structure. The logic device determines navigation control signals based on the navigation control parameters and perimeter sensor data and provides the navigation control signals to a navigation control system for the mobile structure. Control signals may be displayed to a user and/or used to adjust a steering actuator, a propulsion system thrust, and/or other operational systems of the mobile structure.

20 Claims, 18 Drawing Sheets

Related U.S. Application Data a continuation-in-part of application No. 16/533,572, filed on Aug. 6, 2019, now Pat. No. 11,899,465, said application No. 16/533,598 is a continuation of application No. PCT/US2018/037954, filed on Jun. 15, 2018, said application No. 16/533,572 is a continuation of application No. PCT/US2018/037953, filed on Jun. 15, 2018.

(60) Provisional application No. 62/965,768, filed on Jan. 24, 2020, provisional application No. 62/628,905, filed on Feb. 9, 2018, provisional application No. 62/584,718, filed on Nov. 10, 2017, provisional application No. 62/521,346, filed on Jun. 16, 2017.

(51) Int. Cl.
  *B63B 49/00* (2006.01)
  *G08G 3/02* (2006.01)

(56) References Cited

U.S. PATENT DOCUMENTS

| | | | |
|---|---|---|---|
| 3,301,510 A | 1/1967 | Cook | |
| 3,436,531 A | 4/1969 | Throckmorton | |
| 3,488,954 A | 1/1970 | Thomas et al. | |
| 3,741,474 A | 6/1973 | Kawada et al. | |
| 4,129,087 A | 12/1978 | Dimmick et al. | |
| 4,524,615 A | 6/1985 | Curran et al. | |
| 5,140,416 A | 8/1992 | Tinkler | |
| 5,488,674 A | 1/1996 | Burt et al. | |
| 5,523,951 A | 6/1996 | Kriesgman et al. | |
| 5,525,081 A | 6/1996 | Mardesich et al. | |
| 5,537,818 A | 7/1996 | Hosseini et al. | |
| 5,548,694 A * | 8/1996 | Frisken Gibson | G06T 15/10 345/427 |
| 5,729,016 A | 3/1998 | Klapper et al. | |
| 5,815,411 A | 9/1998 | Ellenby | |
| 6,273,771 B1 | 8/2001 | Buckley et al. | |
| 6,450,112 B1 | 9/2002 | Deghuee | |
| 6,677,889 B2 | 1/2004 | Van Rees et al. | |
| 7,021,231 B2 | 4/2006 | Smart | |
| 7,305,928 B2 | 12/2007 | Bradley et al. | |
| 7,469,168 B1 | 12/2008 | Richey | |
| 7,727,036 B1 | 6/2010 | Poorman et al. | |
| 8,078,297 B2 | 12/2011 | Lasher et al. | |
| 8,215,252 B1 * | 7/2012 | Chun | B63B 39/08 440/51 |
| 8,275,544 B1 | 9/2012 | Wells et al. | |
| 8,604,976 B1 | 12/2013 | Chang et al. | |
| 8,622,778 B2 | 1/2014 | Tyers et al. | |
| 8,978,259 B1 | 3/2015 | Stephenson, Jr. | |
| 9,123,220 B2 | 9/2015 | Icove et al. | |
| 9,471,970 B2 | 10/2016 | Strandmar | |
| 9,515,106 B2 | 12/2016 | Hourtash et al. | |
| 9,676,464 B2 | 6/2017 | Johnson et al. | |
| 9,778,657 B2 | 10/2017 | Tyers | |
| 10,095,232 B1 | 10/2018 | Arbuckle et al. | |
| 10,324,468 B2 | 6/2019 | Arbuckle et al. | |
| 10,671,073 B2 | 6/2020 | Arbuckle et al. | |
| 10,747,226 B2 | 8/2020 | Johnson et al. | |
| 10,908,678 B2 | 2/2021 | Johnson et al. | |
| 10,931,934 B2 | 2/2021 | Richards et al. | |
| 10,942,028 B2 | 3/2021 | Johnson et al. | |
| 2002/0030591 A1 | 3/2002 | Paranjpe | |
| 2003/0137443 A1 | 7/2003 | Rees et al. | |
| 2003/0149528 A1 | 8/2003 | Lin | |
| 2005/0075016 A1 | 4/2005 | Bertetti et al. | |
| 2007/0055446 A1 | 3/2007 | Schiffmann et al. | |
| 2007/0089660 A1 | 4/2007 | Bradley et al. | |
| 2009/0043904 A1 | 2/2009 | Okuyama | |
| 2009/0048726 A1 | 2/2009 | Lofall | |
| 2009/0076717 A1 | 3/2009 | Goutelard et al. | |
| 2009/0171520 A1 | 7/2009 | Kaji | |
| 2009/0222154 A1 | 9/2009 | Lopriore | |
| 2010/0094491 A1 | 4/2010 | Oehlgrien et al. | |
| 2010/0100325 A1 * | 4/2010 | Lovell | G08G 1/164 701/301 |
| 2010/0138083 A1 | 6/2010 | Kaji | |
| 2010/0228420 A1 | 9/2010 | Lee | |
| 2010/0234129 A1 | 9/2010 | Sharma et al. | |
| 2010/0309315 A1 | 12/2010 | Hogasten et al. | |
| 2011/0046843 A1 | 2/2011 | Caveney | |
| 2011/0279673 A1 | 11/2011 | Teich et al. | |
| 2011/0307128 A1 | 12/2011 | Igarashi et al. | |
| 2012/0129410 A1 | 5/2012 | Tyers | |
| 2012/0130570 A1 | 5/2012 | Pease | |
| 2012/0132120 A1 | 5/2012 | Gai et al. | |
| 2012/0229597 A1 | 9/2012 | Gagel | |
| 2012/0262584 A1 | 10/2012 | Strandemar | |
| 2012/0265380 A1 * | 10/2012 | Kuwata | G05D 1/0206 701/21 |
| 2012/0290175 A1 | 11/2012 | Hisanaga | |
| 2013/0063599 A1 | 3/2013 | Imai et al. | |
| 2013/0113939 A1 | 5/2013 | Strandemar | |
| 2013/0173096 A1 | 7/2013 | Chalhoub et al. | |
| 2013/0297104 A1 | 11/2013 | Tyers et al. | |
| 2014/0106631 A1 | 4/2014 | Ito | |
| 2014/0156133 A1 | 6/2014 | Cullinane et al. | |
| 2014/0316657 A1 | 10/2014 | Johnson et al. | |
| 2014/0330480 A1 | 11/2014 | Kopper et al. | |
| 2015/0089427 A1 * | 3/2015 | Akuzawa | G05D 1/0206 715/771 |
| 2015/0089434 A1 | 3/2015 | Akuzawa | |
| 2015/0125065 A1 | 5/2015 | Lee et al. | |
| 2015/0154460 A1 | 6/2015 | Baba et al. | |
| 2016/0187883 A1 | 6/2016 | Tyers et al. | |
| 2016/0214534 A1 | 7/2016 | Richards et al. | |
| 2016/0217578 A1 | 7/2016 | Can et al. | |
| 2017/0205829 A1 * | 7/2017 | Tyers | B63H 25/04 |
| 2017/0210008 A1 * | 7/2017 | Maeda | B25J 9/1682 |
| 2017/0210449 A1 | 7/2017 | Frisbie et al. | |
| 2017/0365175 A1 | 12/2017 | Harnett | |
| 2018/0015994 A1 * | 1/2018 | Kishimoto | B63H 25/46 |
| 2018/0075383 A1 | 3/2018 | Fogel et al. | |
| 2018/0362028 A1 * | 12/2018 | Prokhorov | B62D 15/0255 |
| 2019/0163191 A1 * | 5/2019 | Sorin | G06F 16/9024 |
| 2019/0243371 A1 * | 8/2019 | Nister | G05D 1/0223 |
| 2019/0359300 A1 | 11/2019 | Johnson et al. | |
| 2019/0361457 A1 | 11/2019 | Johnson et al. | |
| 2020/0025873 A1 | 1/2020 | Kubertschak et al. | |
| 2020/0193812 A1 * | 6/2020 | Morris | G05D 1/228 |
| 2020/0202719 A1 * | 6/2020 | Derginer | B63H 25/46 |
| 2020/0369351 A1 * | 11/2020 | Behrendt | G06V 20/00 |
| 2020/0401143 A1 | 12/2020 | Johnson et al. | |
| 2021/0166568 A1 | 6/2021 | Kersulec et al. | |
| 2021/0206460 A1 | 7/2021 | Hawker | |

FOREIGN PATENT DOCUMENTS

| | | |
|---|---|---|
| CN | 103149948 | 6/2013 |
| DE | 19803078 | 7/1999 |
| DE | 19807525 | 9/1999 |
| EP | 1873052 | 1/2008 |
| EP | 2096018 | 9/2009 |
| GB | 1125306 A | 8/1968 |
| GB | 1223986 | 3/1971 |
| GB | 1419244 | 12/1975 |
| GB | 2369607 B | 11/2003 |
| GB | 2388355 B | 1/2004 |
| GB | 2388356 B | 1/2004 |
| GB | 2429541 | 2/2007 |
| JP | H0622980 U | 3/1994 |
| JP | 2013086745 | 5/2013 |
| JP | 2017 052297 A | 3/2017 |
| KR | 2008-0071269 A | 8/2008 |
| KR | 20120072516 A | 7/2012 |
| WO | WO 02/030291 A1 | 4/2002 |
| WO | WO 02/097763 A1 | 12/2002 |
| WO | WO 2008/084465 A2 | 7/2008 |
| WO | WO 2014/168674 | 10/2014 |
| WO | WO 2016/034516 A2 | 3/2016 |
| WO | WO 2016/109601 A1 | 7/2016 |
| WO | WO 2016/109832 A2 | 7/2016 |

(56) References Cited

FOREIGN PATENT DOCUMENTS

| WO | WO 2017/167890 | 10/2017 |
| WO | WO 2018/232376 A1 | 12/2018 |
| WO | WO 2019/157400 A1 | 8/2019 |

OTHER PUBLICATIONS

Rao et al., "Identification of Low-Level Point Radiation Sources Using a Sensor Network," 2008 International Conference on Information Processing in Sensor Networks, pp. 493-504, St. Louis, MO, 2008.

Chin et al., "Accurate localization of low-level radioactive source under noise and measurement errors", pp. 183-196. 10.1145/1460412.1460431, Computer Science Technical Reports, 2008.

Riley et al., "Low Cost Dept and Radiological Sensor Fusion to Detect Moving Sources," 2015 International Conference on 3D Vision (3DV), Oct. 19-22, 2015.

Gorovyi et al., "A Novel Trajectory Restoration Algorithm for High-Resolution SAR Imaging", 2014 15$^{th}$ International Radar Symposium, Jun. 16, 2014, 4 pages, IEEE, Piscataway, NJ.

Gierusz et al., "Multivariable Robust Steering of the Ship with Feedforward Controller", IFAC Proceedings Volumes, 2007, pp. 310-314, vol. 40, Issue 17, Elsevier, Amsterdam, Netherlands.

\* cited by examiner

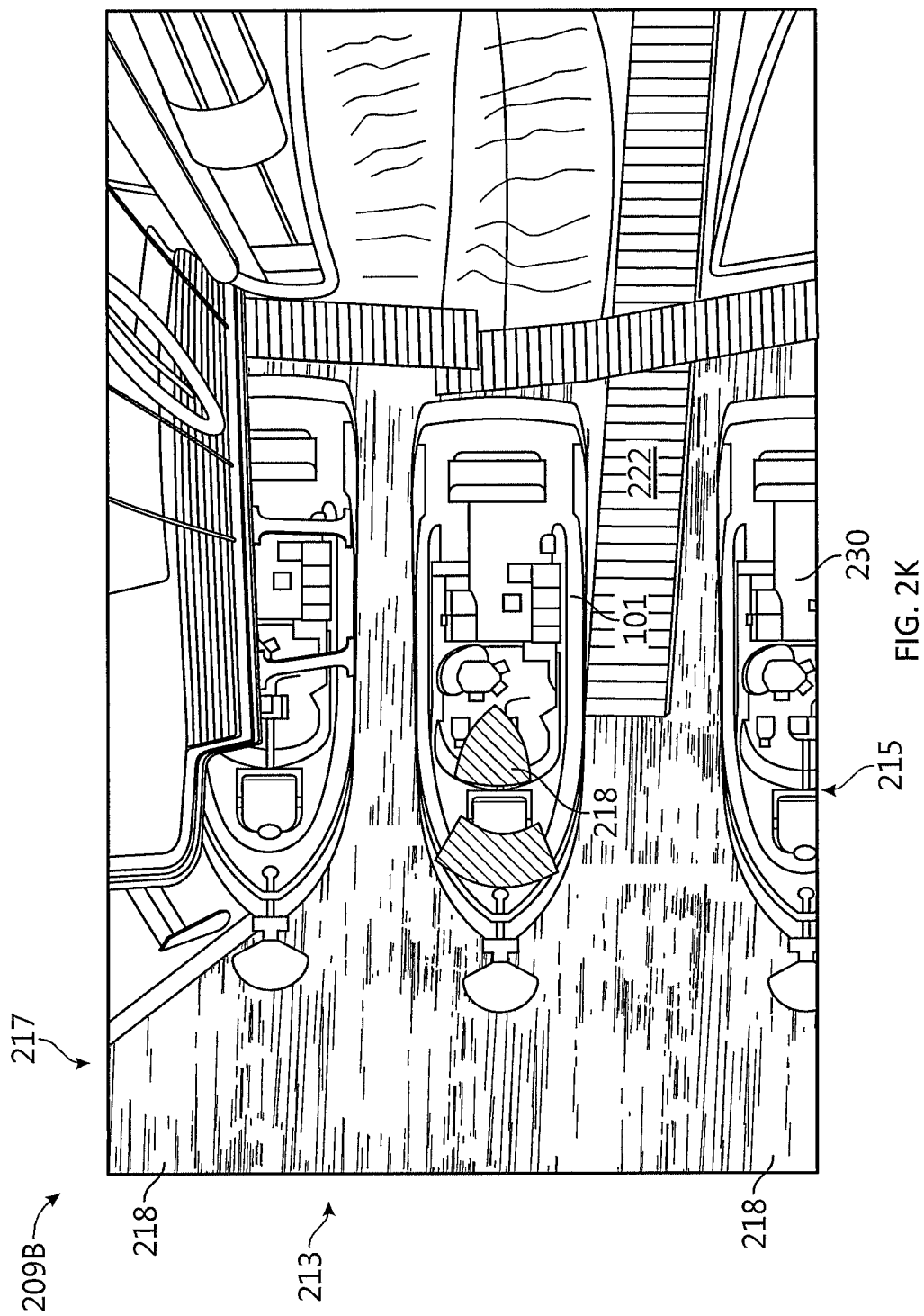

COLLISION AVOIDANCE SYSTEMS AND METHODS

CROSS-REFERENCE TO RELATED APPLICATIONS

This application claims priority to and the benefit of U.S. Provisional Patent Application No. 62/965,768 filed Jan. 24, 2020 and entitled "COLLISION AVOIDANCE SYSTEMS AND METHODS," which is incorporated herein by reference in its entirety.

This application is a continuation-in-part of U.S. patent application Ser. No. 16/533,572 filed Aug. 6, 2019 and entitled "AUTONOMOUS AND ASSISTED DOCKING SYSTEMS AND METHODS," which is hereby incorporated by reference in its entirety. U.S. patent application Ser. No. 16/533,572 is a continuation of International Patent Application No. PCT/US2018/037953 filed Jun. 15, 2018 and entitled "AUTONOMOUS AND ASSISTED DOCKETING SYSTEMS AND METHODS," which is hereby incorporated by reference in its entirety. International Patent Application No. PCT/US2018/037953 claims priority to and the benefit of U.S. Provisional Patent Application No. 62/628,905 filed Feb. 9, 2018 and entitled "AUTONOMOUS AND ASSISTED DOCKING SYSTEMS AND METHODS," U.S. Provisional Patent Application No. 62/584,718 filed Nov. 10, 2017 and entitled "AUTONOMOUS AND ASSISTED DOCKING SYSTEMS AND METHODS," and U.S. Provisional Patent Application No. 62/521,346 filed Jun. 16, 2017 and entitled "AUTONOMOUS AND ASSISTED DOCKING SYSTEMS AND METHODS," all of which are hereby incorporated by reference in their entirety.

This application is a continuation-in-part of U.S. patent application Ser. No. 16/533,598 filed Aug. 6, 2019 and entitled "PERIMETER RANGING SENSOR SYSTEMS AND METHODS," which is hereby incorporated by reference in its entirety. U.S. patent application Ser. No. 16/533,598 is a continuation of International Patent Application No. PCT/US2018/037954 filed Jun. 15, 2018 and entitled "PERIMETER RANGING SENSOR SYSTEMS AND METHODS," which is hereby incorporated by reference in its entirety. International Patent Application No. PCT/US2018/037954 claims priority to and the benefit of U.S. Provisional Patent Application No. 62/628,905 filed Feb. 9, 2018 and entitled "AUTONOMOUS AND ASSISTED DOCKING SYSTEMS AND METHODS," U.S. Provisional Patent Application No. 62/584,718 filed Nov. 10, 2017 and entitled "AUTONOMOUS AND ASSISTED DOCKING SYSTEMS AND METHODS," and U.S. Provisional Patent Application No. 62/521,346 filed Jun. 16, 2017 and entitled "AUTONOMOUS AND ASSISTED DOCKING SYSTEMS AND METHODS," all of which are hereby incorporated by reference in their entirety.

This application is related to U.S. patent application Ser. No. 16/412,288 filed May 14, 2019 and entitled "AUTOPILOT INTERFACE SYSTEMS AND METHODS," which is incorporated herein by reference in its entirety. U.S. patent application Ser. No. 16/412,288 claims priority to and the benefit of U.S. Provisional Patent Application No. 62/671,394 filed May 14, 2018 and entitled "AUTOPILOT INTERFACE SYSTEMS AND METHODS," which is hereby incorporated by reference in its entirety.

TECHNICAL FIELD

One or more embodiments of the invention relate generally to directional control and more particularly, for example, to systems and methods for collision avoidance during assisted and/or fully autonomous docking and/or navigation for watercraft.

BACKGROUND

Directional control systems are used to provide automated and/or supplemented control for planes, watercraft, and, more recently, automobiles. Conventional automated directional control systems typically require a multitude of relatively expensive and purpose-built actuators and sensors that are difficult to retrofit into an existing vehicle and produce results that are not accurate enough to be used to provide reliable docking or parking assist for a vehicle, particularly in crowded conditions where there is a relatively high risk of collisions with mobile and stationary obstacles and/or while navigational control is complicated by external disturbances, such as by wind or water currents. Thus, there is a need for improved docking assist and general navigational control methodologies, including methodologies for collision avoidance.

SUMMARY

Techniques are disclosed for systems and methods to provide collision avoidance for a mobile structure. In accordance with one or more embodiments, a docking assist system configured for collision avoidance (e.g., also referred to as a collision avoidance system) may include a logic device, a memory, one or more sensors, one or more actuators/controllers, and modules to interface with users, sensors, actuators, and/or other modules of a mobile structure. The logic device may be adapted to receive navigation control (e.g., docking assist) parameters for a mobile structure and perimeter sensor data from a perimeter ranging system. The logic device may be configured to determine docking assist and/or collision avoidance control signals based, at least in part, on the navigation control (e.g., docking assist) parameters and perimeter sensor data. The determined docking assist and/or collision avoidance control signals may be provided to a navigation control system for the mobile structure. These and other control signals may be displayed to a user and/or used to adjust a steering actuator, a propulsion system thrust, and/or other operational systems of the mobile structure.

In various embodiments, a navigation control and/or docking assist system may include a logic device configured to communicate with a user interface and a perimeter ranging system mounted to a mobile structure and to provide navigation control for the mobile structure. The logic device may be configured to receive navigation control parameters from the user interface and perimeter sensor data from the perimeter ranging system; determine one or more navigation control signals based, at least in part, on the received navigation control parameters and the received perimeter sensor data, wherein the one or more navigation control signals comprises a collision avoidance thruster or velocity demand; and provide the one or more navigation control signals to a navigation control system for the mobile structure.

In some embodiments, a method to provide collision avoidance for a mobile structure may include receiving navigation control parameters from a user interface for a mobile structure and perimeter sensor data from a perimeter ranging system mounted to the mobile structure; determining one or more navigation control signals based, at least in part, on the received navigation control parameters and the received perimeter sensor data, wherein the one or more navigation control signals comprises a collision avoidance thruster or velocity demand; and providing the one or more navigation control signals to a navigation control system for the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A-K show diagrams illustrating various aspects of a perimeter ranging system for a navigation control (e.g., including docking assist and/or collision avoidance) system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, navigation control (e.g., including docking assist and/or collision avoidance) systems and methods may provide assisted and/or full automated docking and/or directional control for mobile structures that is substantially more reliable and accurate than conventional systems across a wide variety of types of structures and environmental conditions. Embodiments disclosed herein address deficiencies of conventional methodologies with respect to selection of target docking position and orientation and/or target docking track, perimeter monitoring, navigation hazard avoidance (e.g., collision avoidance), user control of docking approach, and adaptive navigational control of a mobile structure during assisted and/or autonomous docking.

One or more embodiments of the described navigation control (e.g., including docking assist and/or collision avoidance) system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops to model and/or control navigation of the mobile structure during a docking and/or other navigational maneuver. The system may be configured to receive measured or modeled sensor signals and provide navigation control (e.g., including docking assist and/or collision avoidance) control signals, as described herein. For example, the sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with various orientation and/or position measurements to provide relatively high quality and low noise directional control.

Figure 1A:
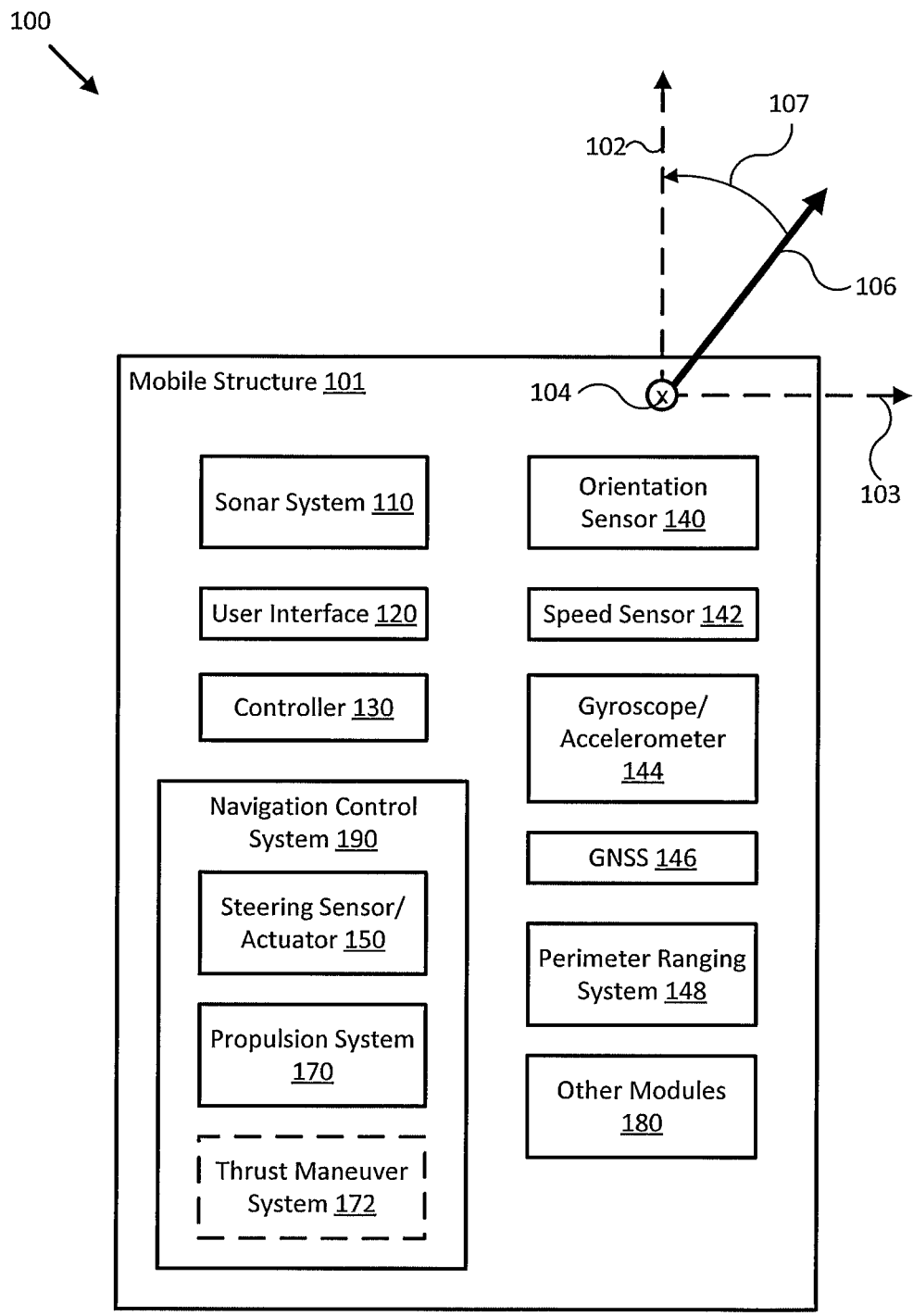
FIG. 1A illustrates a block diagram of a mobile structure including a navigation control (e.g., including docking assist and/or collision avoidance) system in accordance with an embodiment of the disclosure.

As an example, FIG. 1A illustrates a block diagram of system 100 in accordance with an embodiment of the disclosure. In various embodiments, system 100 may be adapted to provide navigation control (e.g., including docking assist and/or collision avoidance) for a particular mobile structure 101. Docking assist of a mobile structure may refer to fully automated docking of the mobile structure, for example, or to assisted docking of the mobile structure, where the system compensates for detected navigation hazards (e.g., such as an approaching dock) and/or various environmental disturbances (e.g., such as a cross wind or a water current) while assisting direct user control of mobile structure maneuvers. Such docking assist may include control of yaw, yaw rate, and/or linear velocity of mobile structure 101. In some embodiments, system 100 may be adapted to measure an orientation, a position, and/or a velocity of mobile structure 101, a relative or absolute wind, and/or a water current. System 100 may then use these measurements to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide navigation control (e.g., including docking assist and/or collision avoidance) for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS," U.S. Provisional Patent Application 61/943,170 filed Feb. 21, 2014 and entitled "MODULAR SONAR TRANSDUCER ASSEMBLY SYSTEMS AND METHODS," and/or U.S. Provisional Patent Application 62/087,189 filed Dec. 3, 2014 and entitled "AUTONOMOUS SONAR SYSTEMS AND METHODS," each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS," which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein. For docking responsiveness, control loop responsiveness may be fast and coupled with relatively low maximum acceleration limits.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water current velocity impacting mobile structure 101. In various embodiments, system 100 may include multiple embodiments of speed sensor 142, such as one wind velocity sensor and one water current velocity sensor.

Gyroscope/accelerometer 144 may be implemented as one or more electronic sextants, semiconductor devices, integrated chips, accelerometer sensors, accelerometer sensor systems, or other devices capable of measuring angular velocities/Client accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101). An embodiment of perimeter ranging system 148 implemented by cameras mounted to watercraft is discussed with reference to FIGS. 2A-I.

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, for example, and may be adapted to sense and/or physically adjust the control surfaces to a variety of positive and/or negative steering angles/positions.

Figure 1B:
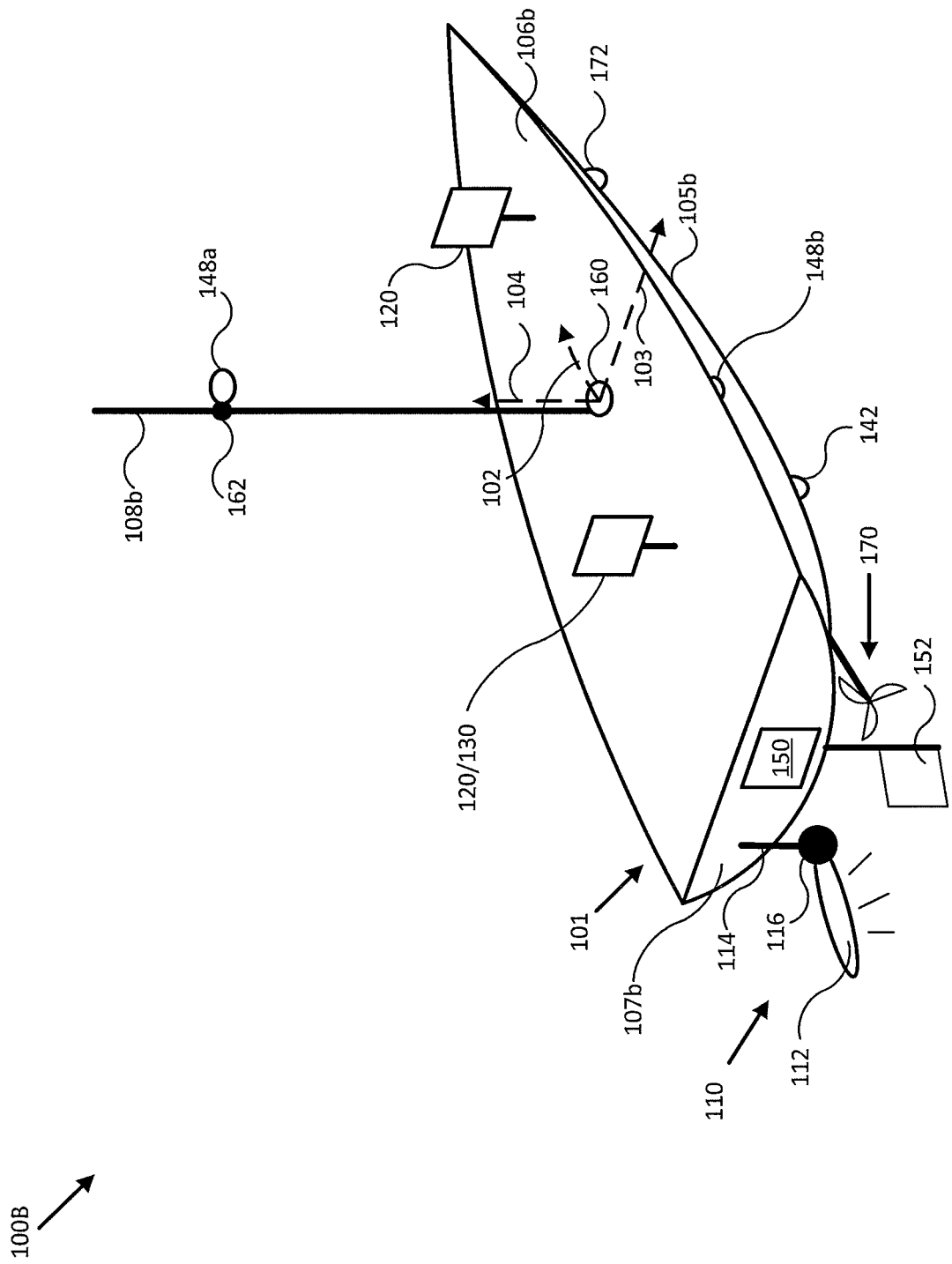
FIG. 1B illustrates a diagram of a watercraft including a navigation control (e.g., including docking assist and/or collision avoidance) system in accordance with an embodiment of the disclosure.
Figure 1C:
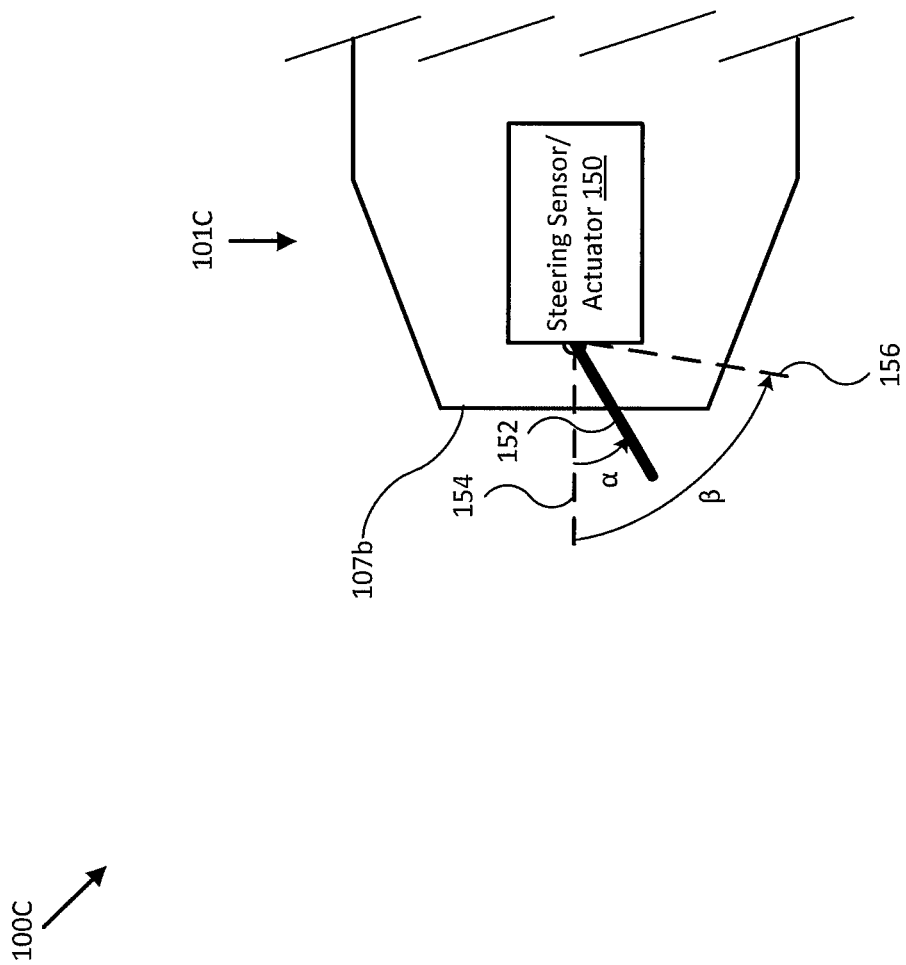
FIG. 1C illustrates a diagram of a steering sensor/actuator for a navigation control (e.g., including docking assist and/or collision avoidance) system in accordance with an embodiment of the disclosure.

For example, FIG. 1C illustrates a diagram of a steering sensor/actuator for a navigation control (e.g., including docking assist and/or collision avoidance) system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 134). In various embodiments, steering sensor/actuator 150 may be implemented with a steering actuator angle limit (e.g., the positive limit is designated by an angle β and a dashed line 136 in FIG. 1), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular docking assist maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle α may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle α may be determined by controller 130 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Figure 1D:
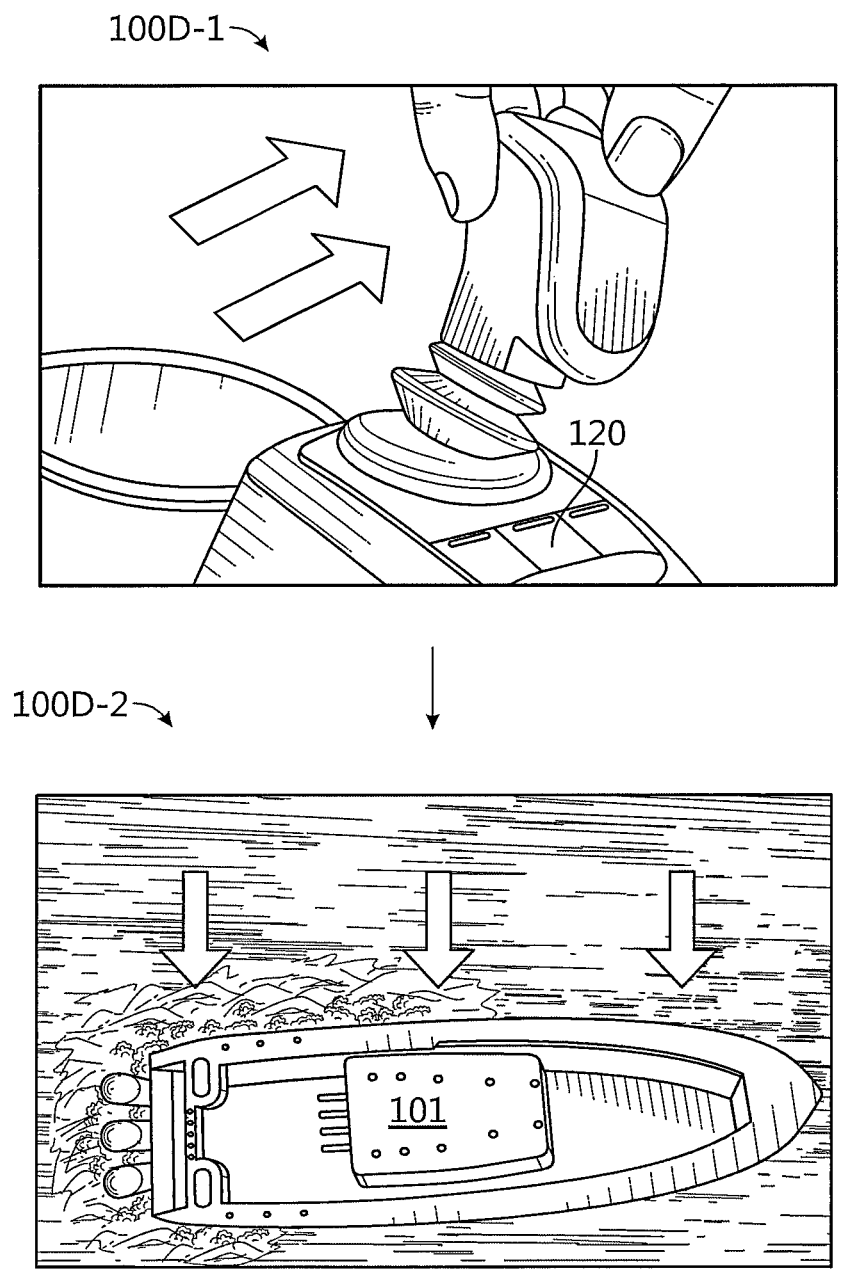
FIGS. 1D-E are diagrams illustrating operation of a thrust maneuver system for a navigation control (e.g., including docking assist and/or collision avoidance) system in accordance with an embodiment of the disclosure.
Figure 1E:
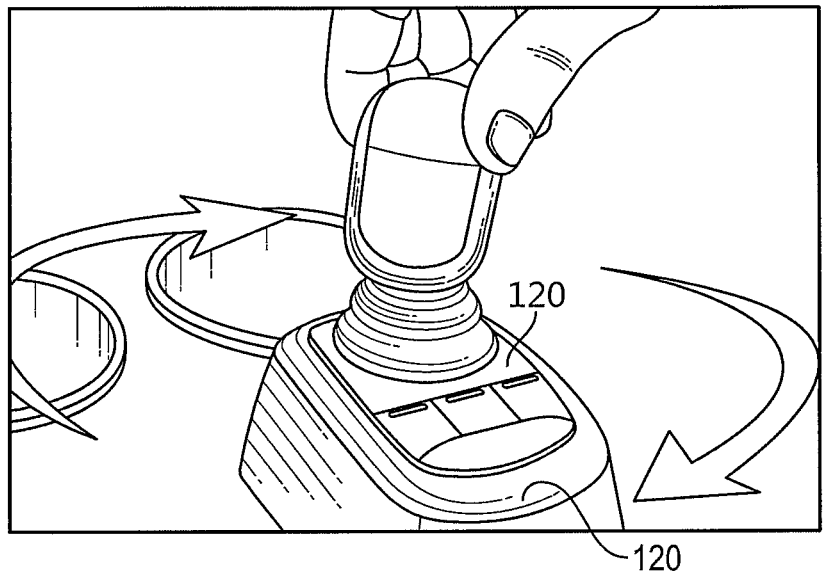
Figure 1E:
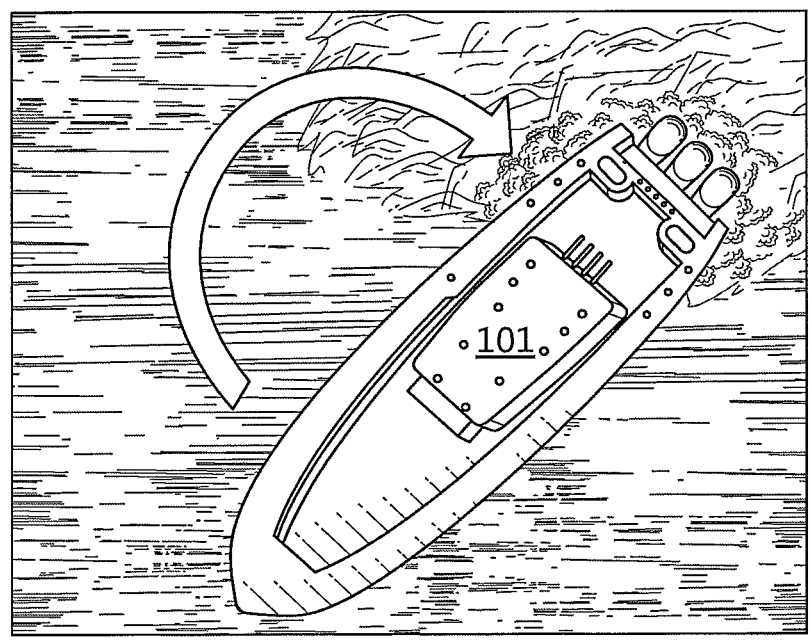

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity. For example, FIGS. 1D-E are diagrams illustrating operation of a thrust maneuver system for a navigation control (e.g., including docking assist and/or collision avoidance) system in accordance with an embodiment of the disclosure. As shown in diagram 100D-1 of FIG. 1D, joystick user interface 120 may be moved laterally by user input to produce the corresponding lateral velocity for mobile structure 101 shown in diagram 100D-2. Similarly, as shown in diagram 100E-1 of FIG. 1E, joystick user interface 120 may be rotated clockwise by user input to produce the corresponding clockwise angular velocity for mobile structure 101 shown in diagram 100E-2.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide docking assist and/or other operational control of mobile structure 101, similar to system 100 of FIG. 1B. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148 according to control signals and/or an orientation or position of mobile structure 101 provided by user interface/controller 120/130. For example, user interface/controller 120/130 may be adapted to receive an orientation of transducer assembly 112 and/or perimeter ranging system 148 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106*b* and/or mast/sensor mount 108*b*. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106*b*) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105*b*, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105*b*. In alternative embodiments, speed sensor 142 may be implemented as a wind velocity sensor, for example, and may be mounted to mast/sensor mount 108*b* to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108*b* (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
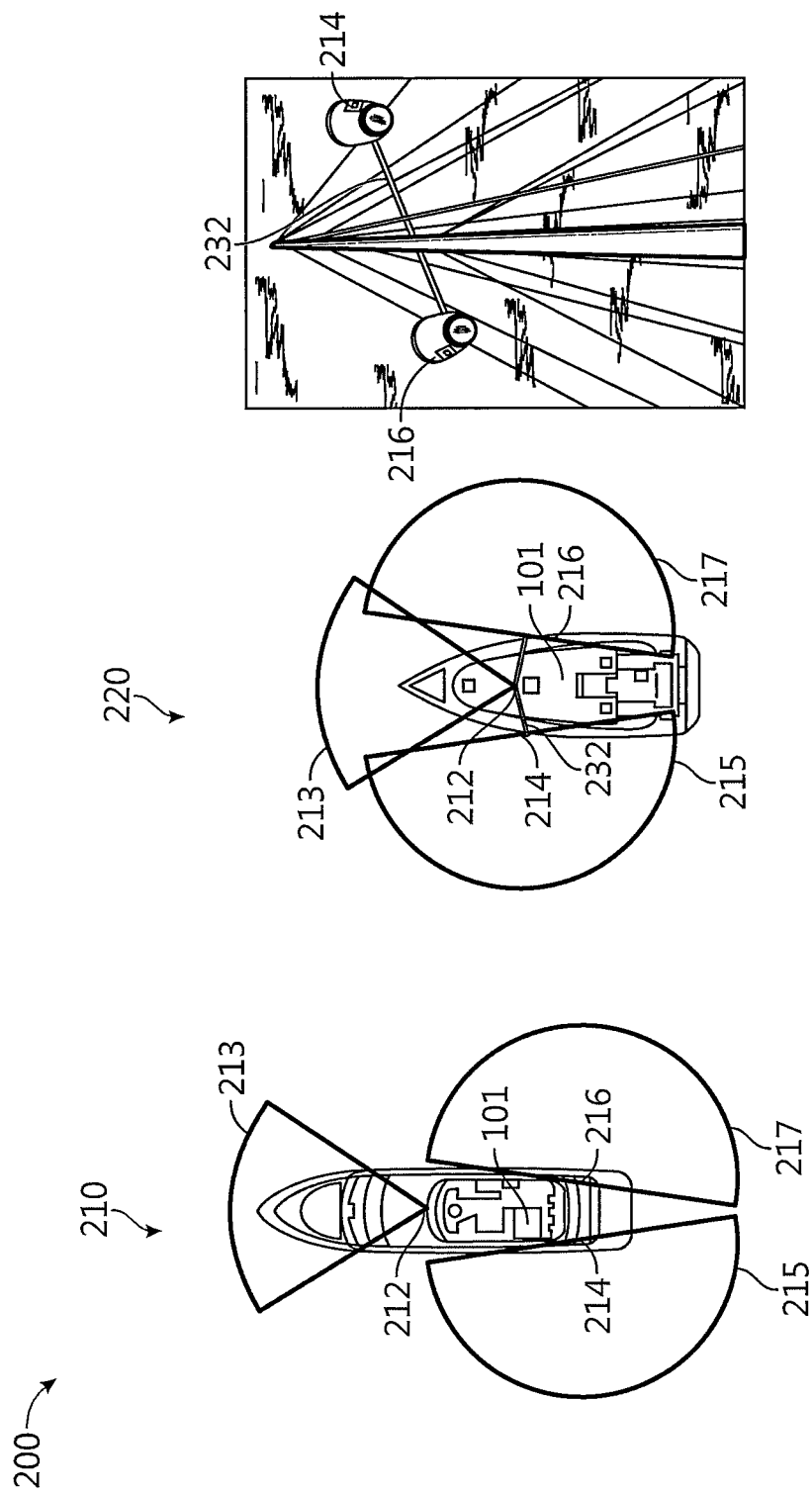

FIGS. 2A-K show diagrams illustrating various aspects of a perimeter ranging system for a navigation control (e.g., including docking assist and/or collision avoidance) system in accordance with an embodiment of the disclosure. For example, FIG. 2A shows diagram 200 illustrating mounting positions and corresponding monitoring perimeters for perimeter ranging system components associated with powered yacht arrangement 210 and sailboat arrangement 220.

Each type of perimeter ranging system includes a variety of its own complications when used to implement a navigation control (e.g., including docking assist and/or collision avoidance) system, and a reliable and accurate perimeter ranging system is necessary for navigation control because GNSS data and cartography data for docks and other obstacles lack sufficient detail and resolution to provide safe navigation control by themselves and because, regardless of improvements in GNSS technology and cartography, there are often many uncharted navigation hazards associated with navigation control.

As an example, conventional radar systems can be relatively easy to retrofit onto a mobile structure, if mounted conventionally high up on mobile structure 101, but they typically suffer from relatively low resolution and so can be unable to detect small objects, such as mooring lines. If mounted conventionally high, a conventional radar system would provide ranging data to controller 130, and controller 130 would be configured to use knowledge of the profile for mobile structure 101 and a measured orientation of mobile structure 101 to determine perimeter sensor data for a detected navigation hazard (e.g., the closest approach distance between a perimeter of mobile structure 101 and the detected navigation hazard). However, by being mounted high, the conventional radar system would typically miss low profile navigation hazards commonly encountered when docking a mobile structure, such as the leading edge of a dock floating minimally above a waterline, particularly as it approaches within a meter of a perimeter of mobile structure 101.

Conventional radar systems may instead be mounted relatively low (e.g., pontoon height) to reliably range such low profile navigation hazards, but this would increase mounting costs and complexity and still result in a system that could miss small but important detail either due to resolution issues or due to conventional beam shapes and corresponding detection areas being too narrow at the point of emission and lacking substantial vertical coverage. Furthermore, if mounted low, a conventional radar system couldn't be used while underway at sea (e.g., due to wave clutter), would be subject to increased risk of damage during docking and/or due to immersion (e.g., sail boat heeled over while underway), would be difficult to mount aesthetically and/or require holes in the hull, and might require extensive cabling routing. As such, conventional radar can be a useful and relatively inexpensive complimentary sensor for a navigation control system, particularly when mounted conventionally to a mast, but would typically require supplemental perimeter sensor data from a separate perimeter ranging system to provide reliable and safe navigation control.

Alternatives include ultrasonic sensor arrays, LIDAR systems, and short range radar systems. Conventional ultrasonic sensor arrays typically do not provide sufficient resolution and range to detect relatively small navigation hazards or to allow a user to specify a docking location, and so, like conventional radar systems, conventional ultrasonic sensor arrays would typically need supplemental perimeter sensor data from a separate perimeter ranging system to provide reliable and safe navigation control, which would increase system cost and complexity.

Newer ultrasonic sensor arrays may include relatively small individual transducer/sensor elements each implemented with its own microcontroller so as not to require relatively expensive shielded sensor wiring to each element (e.g., each element can measure and digitally communicate ranges and/or range profiles to controller 130). For example, unlike automotive solutions which are relatively large and so have to be recessed into the bumper or other surface of the vehicle, and each requiring their own sensor leads, single chip transducer/sensor elements are so small that they can be integrated into a self-adhesive strip that may be surface mounted without significantly impacting a watercraft's aesthetics, hydrodynamic efficiency, or hull/fuselage integrity, and without requiring complex wiring. Rather than having to wire each sensor individually, an array or strip of such single chip transducer/sensor elements can be linked together (e.g., daisy chained, bus linked, mesh linked, and/or linked according to other topologies) so that the array includes a single common power line input and/or a single common communication line input/output, from which all chips may draw power and communicate with each other and/or controller 130, for example. Such strip or array may have a single electrical coupling at one end, so a single cable can be routed to neatly enter into the hull through a single hole disposed in the transom, for example, or the deck. In some embodiments, the power line may support both power delivery to the individual sensor elements and communication between the sensor elements and to/from controller 130. In various embodiments, such sensor arrays/strips may be integrated with and/or along a hull or gunwale of a vessel.

Lidar is improving rapidly and has the advantage of being able to detect navigation hazards without ambient light. Lidar produces a 3d point cloud and so is suited to measuring distances to the dock, and analytics to determine dock/obstacle vs water are straightforward since the water is substantially a flat plane and objects more than a predetermined threshold above this plane can be designated as navigation hazards. The LIDAR data can be rendered as an image from an elevated perspective, making it relatively easy and intuitive for a user to designate a target docking position. However, LIDAR is currently expensive, especially if multiple installations are required to get a clear view of the perimeter of mobile structure 101 (e.g., port and starboard installations). Short range radar systems (e.g., including approximate square centimeter sized two and/or three dimensional radar antenna arrays configured to detect and/or range objects between a few centimeters and 10s of meters away) are also improving rapidly, but such systems could be relatively prone to damage and would be relatively complex to mount and wire along a perimeter of mobile structure 101 in order to provide sufficient coverage for common docking assist and/or other maneuvers.

A less expensive alternative, according to embodiments disclosed herein, is one or more cameras (e.g., including visible spectrum and/or infrared/thermal imaging modules) mounted relatively high on mobile structure 101 to provide a sufficient monitoring perimeter around mobile structure 101 and a sufficient vertical perspective of a perimeter of mobile structure 101 to reliably detect and range navigation hazards relatively close to the perimeter of mobile structure 101 (e.g., within a meter of the perimeter of mobile structure 101). Each camera may include a microelectromechanical systems (MEMS) based gyroscope/accelerometer sensor (e.g., similar to gyroscope/accelerometer 144) configured to provide a vertical reference (e.g., corresponding to the gravitational "down" vector) for images captured by the camera, for example, and/or the camera and/or controller 130 may be configured to determine a horizontal reference (e.g. corresponding to a horizon, such as where the sea surface meets the horizon). From these references and a known height of the camera, reliable and precise ranges between a perimeter of mobile structure 101 and a detected navigation hazard can be determined, and without need of supplemental perimeter sensor data and/or perimeter ranging systems, as described herein.

FIG. 2A shows diagram 200 illustrating mounting positions and corresponding monitoring perimeters for perimeter ranging system components associated with powered yacht arrangement 210 and sailing yacht arrangement 220, in accordance with an embodiment of the disclosure. In powered yacht arrangement 210, perimeter ranging system 148 includes cameras mounted at positions 212, 214, and 216 providing a monitoring perimeter for mobile structure 101 corresponding roughly to the combined fields of view (FOVs) 213, 215, and 217, as shown. As can be seen from FOVs 213, 215, and 217, camera 212 may be implemented by a relatively narrow FOV navigational camera aimed substantially forward with respect to mobile structure 101 so as to detect navigation hazards substantially off the bow of mobile structure 101, both while docking and while underway. Cameras 214 and 216 may be implemented by relatively wide FOV docking cameras (e.g., fisheye lens cameras) aimed down and over respective port and starboard sides of mobile structure 101 so as to detect navigational hazards substantially port, starboard, and/or aft of mobile structure 101. In various embodiments, one or more of cameras 212, 214, and 216 may be mounted to mobile structure 101 at different mounting points and/or using an actuated mount, so as to adjust FOVs 213, 215, and 217 and/or a monitoring perimeter for perimeter ranging system 148 (e.g., according to a speed of mobile structure 101 and/or other operational modes for mobile structure 101 and/or system 100).

In sailing yacht arrangement 210, perimeter ranging system 148 includes cameras mounted at positions 212, 214, and 216 providing a monitoring perimeter for mobile structure 101 corresponding roughly to the combined FOVs 213, 215, and 217, as shown. As can be seen from FOVs 213, 215, and 217, cameras 214 and 216 may be mounted at ends of a spreader 232 to place them as close to the width of the beam of mobile structure 101 as possible so they can view navigation hazards arbitrarily close to a perimeter (e.g., the hull) of mobile structure 101. Furthermore, cameras 214 and 216 may be mounted such that their respective FOVs 215 and 217 each at least partially overlap with FOV 213 of camera 212, so as to provide a seamless monitoring perimeter.

More generally, perimeter ranging system 148 may include any number of articulated and/or non-articulated cameras mounted about mobile structure 101 to provide a targeted monitoring perimeter (e.g., a temporally changing monitoring perimeter) and/or seamless monitoring perimeter about mobile structure 101. For example, such monitoring perimeter may increase or decrease in size with a linear and/or angular velocity of mobile structure 101, and/or may be biased towards a linear or angular velocity of mobile structure 101 to provide a larger monitoring perimeter in the direction of motion of mobile structure 101. Controller 130 and/or perimeter ranging system 130 may be configured to detect navigation hazards within the monitoring perimeter, for example, and determine ranges to the navigation hazards and/or relative velocities of the navigation hazards.

If the ranges to the navigation hazards are within a safety perimeter for mobile structure 101, or the relative velocities of the navigation hazards towards mobile structure 101 are greater than a hazard velocity limit, controller 130 may be configured to determine navigation control (e.g., including docking assist and/or collision avoidance) control signals configured to cause navigation control system 190 to maneuver mobile structure 101 to evade the navigation hazards by maintaining or increasing the range to a navigation hazard or by decreasing the relative velocity of the navigation hazard towards the mobile structure. Such safety perimeter may be a preselected range from a perimeter of mobile structure 101 and/or from an approximate center of mobile structure 101, for example, may be provided by a manufacturer, by regulation, and/or by user input, and may vary according to a velocity of mobile structure 101. The hazard velocity limit may be a preselected velocity limit corresponding to relative velocities of navigation hazards towards mobile structure 101 (e.g., the component of their relative velocities towards a center of mobile structure 101 and/or towards a neared approach to a perimeter of mobile structure 101), for example, may be provided by a manufacturer, by regulation, and/or by user input, and may vary according to a velocity of mobile structure 101.

Figure 2B:
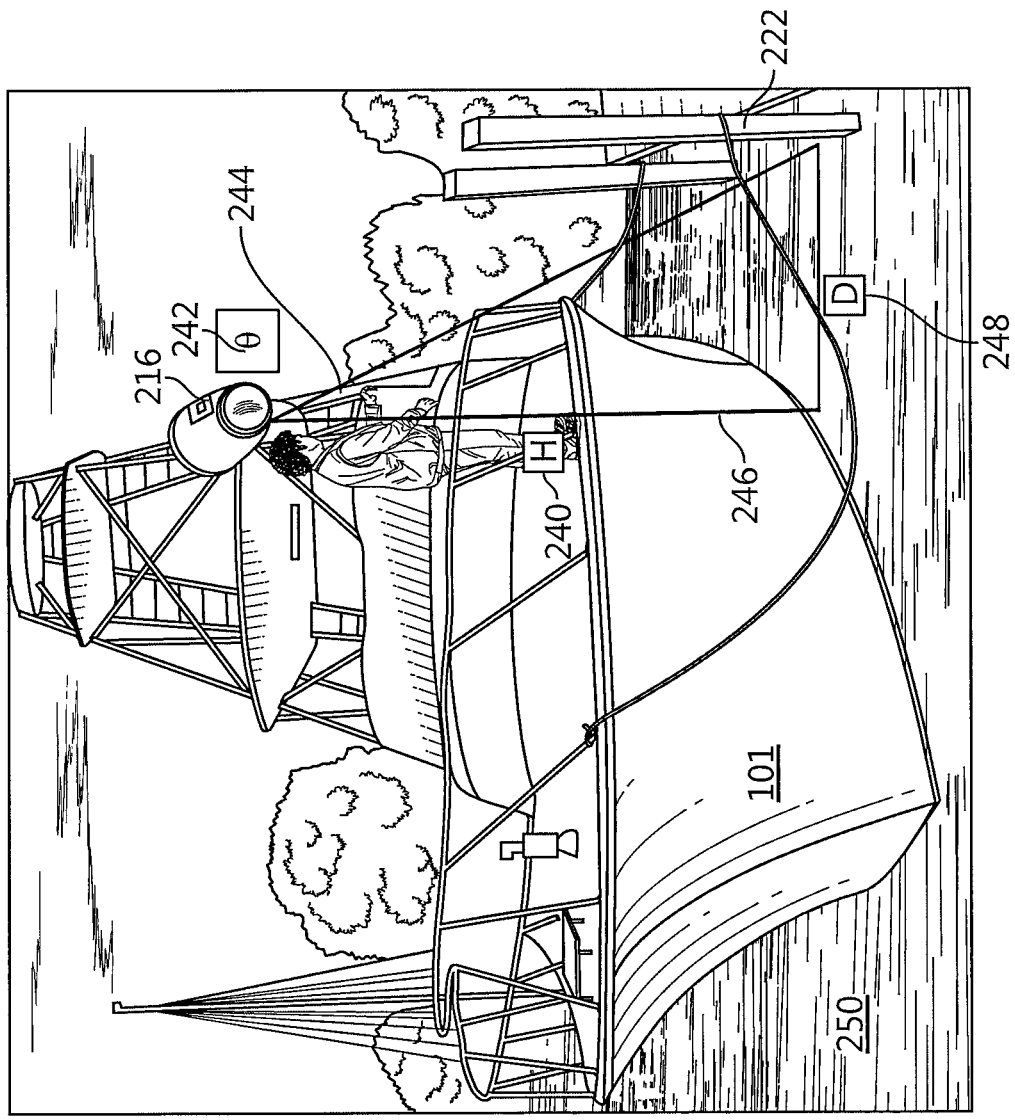

Because cameras intrinsically measure angle to a high degree of accuracy and precision, and because the camera mounting height above the water surface can be known accurately, it is possible to obtain reliable distance measurements navigation hazards in view of the cameras. For example, FIG. 2B shows diagram 201 illustrating a range measurement associated with perimeter ranging system 148 including docking camera 216, in accordance with an embodiment of the disclosure. As shown in diagram 201, camera 216 may be mounted to mobile structure 101 at height 240 above water surface 250 and in view of at least a portion of a side of mobile structure 101 and dock 222. In various embodiments, angle 242 between vertical vector 246 and navigation hazard view vector 244 may be used to find the range 248 from mobile structure 101 to dock 222, where range 248=height 240*tan(angle 242). In various embodiments, navigation hazard view vector 244 may correspond to the position within the FOV of camera 216 where dock 222 intersects water surface 250, and angle 242 may be determined based on operating characteristics of camera 216.

Figure 2C:
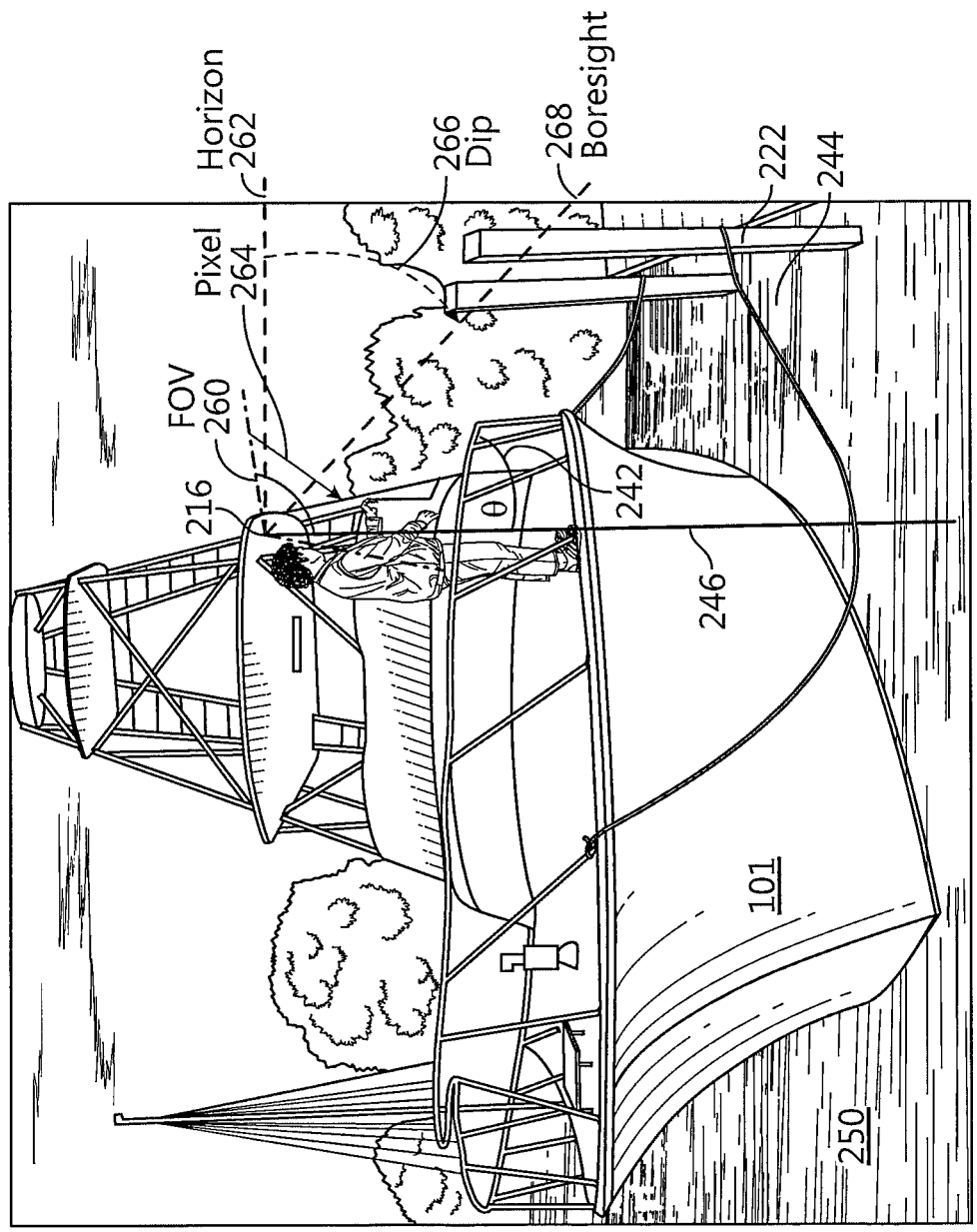

FIG. 2C shows diagram 202 illustrating a range measurement associated with perimeter ranging system 148 including docking camera 216, in accordance with an embodiment of the disclosure. In particular, diagram 202 shows one technique to determine angle 242 of FIG. 2B. As noted herein, water surface 250 is substantially horizontal, which can be used to provide one of two triangle perpendiculars (e.g., the horizontal reference); the other perpendicular is a vertical reference. A vertical reference may be provided by user input indicating mounting offsets, an automatic calibration process configured to detect vertical offsets through image processing (e.g., through horizon detection or similar), and/or by gyroscope/accelerometer sensors integrated with the camera and factory aligned to the FOV of the camera. For example, a 3 axis MEMS accelerometer can be integrated with the camera and factory aligned to its boresight. Furthermore, the MEMS accelerometer may be combined with a MEMS gyroscope to detect and compensate for momentary accelerations of mobile structure 101 to prevent such accelerations from introducing short term errors in the vertical reference.

As such, in various embodiments, angle 242 can be obtained from: angle 242=90−((Pixel 264−NoPixels/2) *CameraFOV 260/NoPixels)−DipAngle 266, where DipAngle 266 is the angle between horizontal reference vector 262 (e.g., which is perpendicular to the vertical reference and parallel to the horizon) and boresight vector 268, CameraFOV 260 is the vertical angular FOV of camera 216, Pixel 264 is the pixel distance between an edge of CameraFOV 260 and navigation hazard view vector 244, and NoPixels is the number of pixels across CameraFOV 260. Other techniques are contemplated, including other techniques relying on physical and/or operating characteristics of camera 216.

Such distance measurements require some image analytics to detect where dock 222 intersects water surface 250. In some embodiments, controller 130 may be configured to execute neural networks trained to recognize dock features and other navigation hazards such as mooring warps or other watercraft and to differentiate such navigation hazards from other objects such as seaweed, seagulls. Alternative and complimentary statistical processes can be used. In some embodiments, such analytics architected for minimal latency by performing the analytics before compressing and converting the images for further image processing. For example, a wired communications link may be formed between camera 216 of perimeter ranging system 148 and controller 130 where the communications link enables uncompressed high speed video to be transferred down a single cable with lower speed control and data overlaid bi-directionally.

Figure 2D:
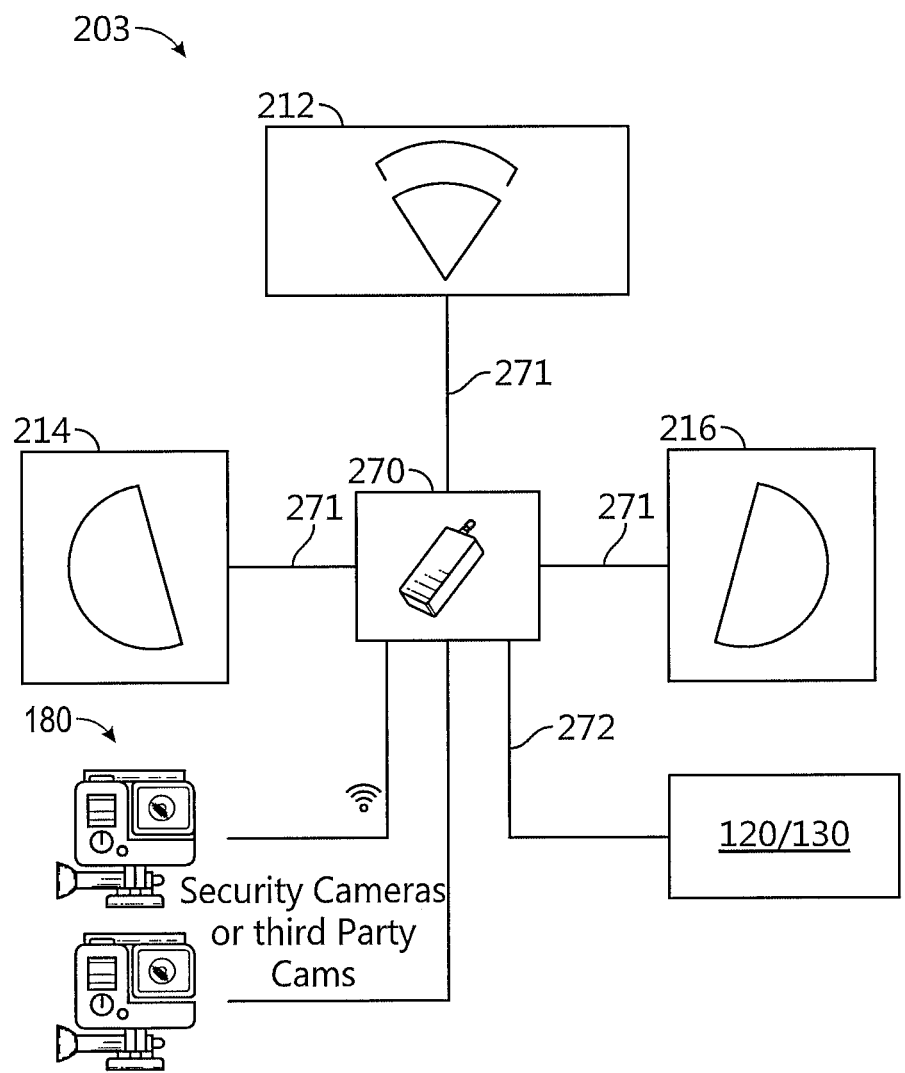

FIG. 2D shows diagram 203 illustrating a system architecture for perimeter ranging system 148 utilizing such communication link, in accordance with an embodiment of the disclosure. As shown in diagram 203, perimeter ranging system 148 may include cameras 212, 214, and 216 coupled to image analyzer 270 over wired communication links 271, which may be configured to provide processed imagery and analytics metadata to user interface/controller 120/130 over communication link 272. Such architecture allows image analyzer 270 to provide analytics substantially in real time with minimal latency at relatively low cost. For example, image analyzer 270 may be implemented with a vector processor (e.g., such as a Myriad 2 or Myriad 3 vector processor) coupled to a video processing integrated circuit (e.g., such as the Ambarella S3L or S5L video processing ICs). In various embodiments, image analyzer 270 may be configured to identify navigation hazards and other objects in a maritime scene, such as those shown in display views provided in FIGS. 2F-I. Image analyzer 270 may be configured to precisely stitch images received from cameras 212, 214, and 216 (e.g., by recognizing shoreline feature and using them as a basis for aligning images from different cameras). Also shown in diagram 203 are various other imaging devices 180, which may include security cameras, sports cameras, smart phone cameras, and/or other imaging devices that can be configured to interface with image analyzer 270.

Figure 2E:
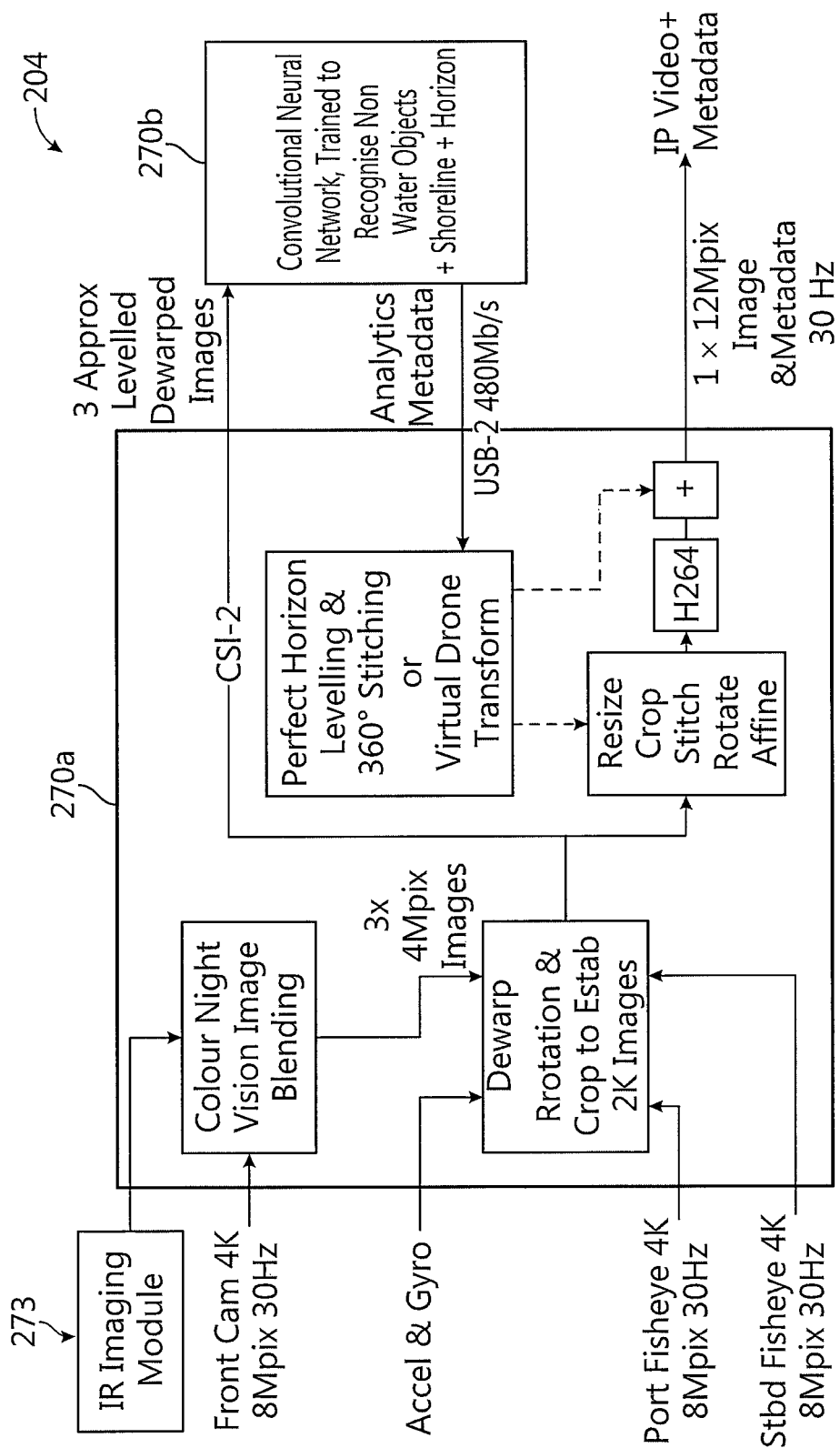

FIG. 2E shows diagram 204 illustrating a system architecture for perimeter ranging system 148 utilizing image analyzer 270, in accordance with an embodiment of the disclosure. As shown in diagram 2E, imaging devices 273 provide images and/or video to video processing integrated circuit 270a of image analyzer 270, which collaborates with co-processor 270b of image analyzer 270 to detect and identify navigation hazards and other objects in the images provided by imaging devices 273. Resulting processed imagery (e.g., stitched imagery, synthetic viewpoint elevation imagery, and/or other processed imagery) and/or analytics metadata (e.g., bounding boxes, extents, type, and/or other characteristics of detected and identified navigation hazards and other objects) may then be provided to other elements of system 100, such as user interface 120 and/or controller 130.

In some embodiments, image analyzer 270 may be configured to stitch images provided by any one or combination of cameras 212, 214, and/or 216, for example, to generate an all-around view while navigating at sea and/or to generate a synthetic elevated view (e.g., a top-down view) while docking. In general, it is topologically impossible to show an all-round de-warped view by simply stitching two fisheye camera outputs together. However, a synthetic elevated view, also referred to as a virtual drone view, may be generated from such images, which changes the viewpoint to something that can be projected onto a flat screen. Unlike conventional automotive systems, which typically create significant distortions with respect to nearby objects, the relatively high mounting point of at least cameras 214 and 216 results in less distortion and thereby facilitates producing accurate distance measurements and more intuitive imagery. In some embodiments, such virtual drone views may be scaled so that distances can be read off directly from the display of user interface 120 by a user.

Figure 2F:
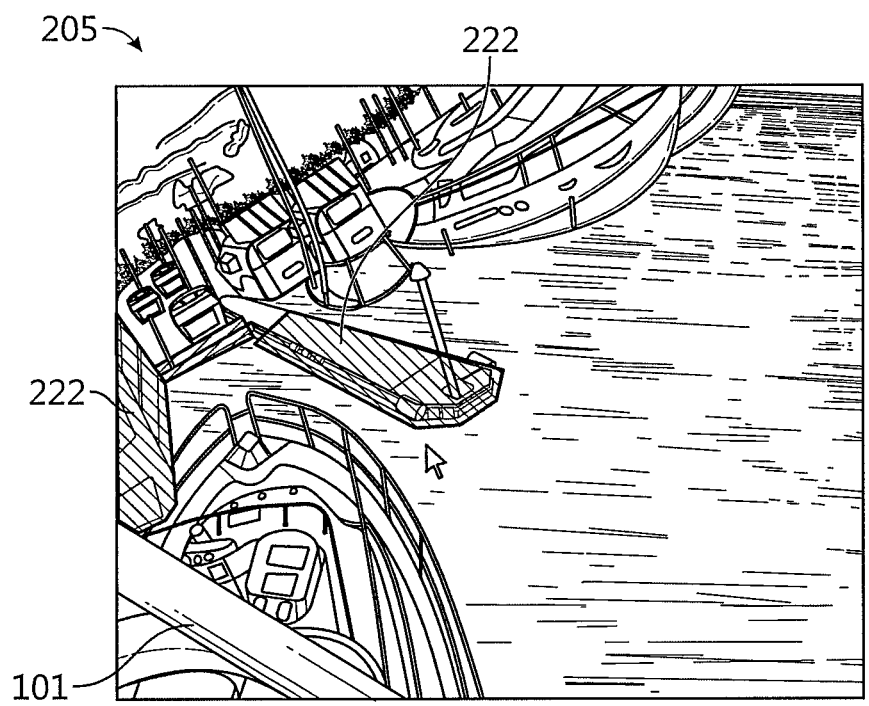
Figure 2G:
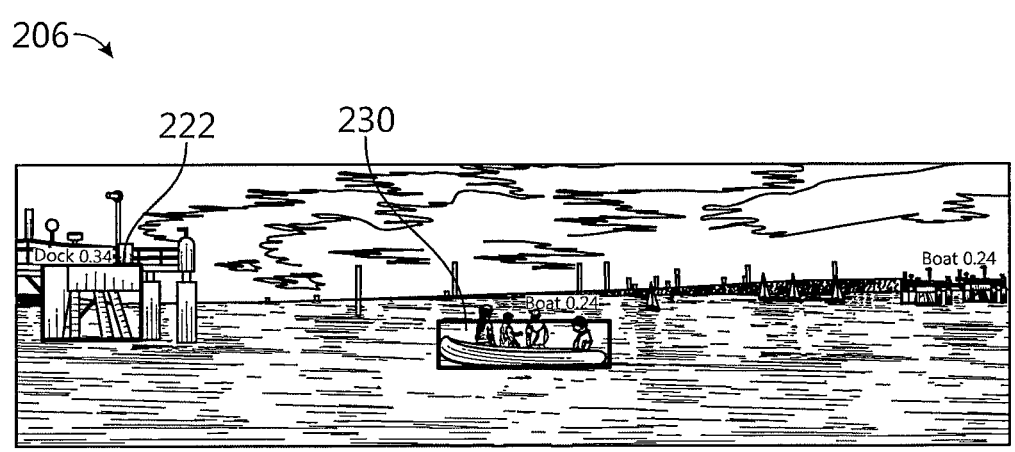
Figure 2H:
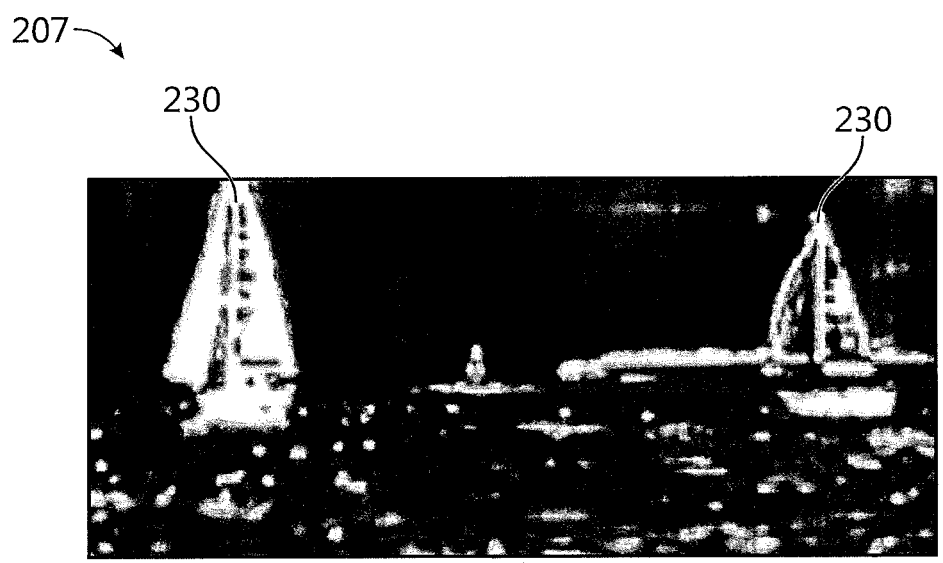
Figure 2I:
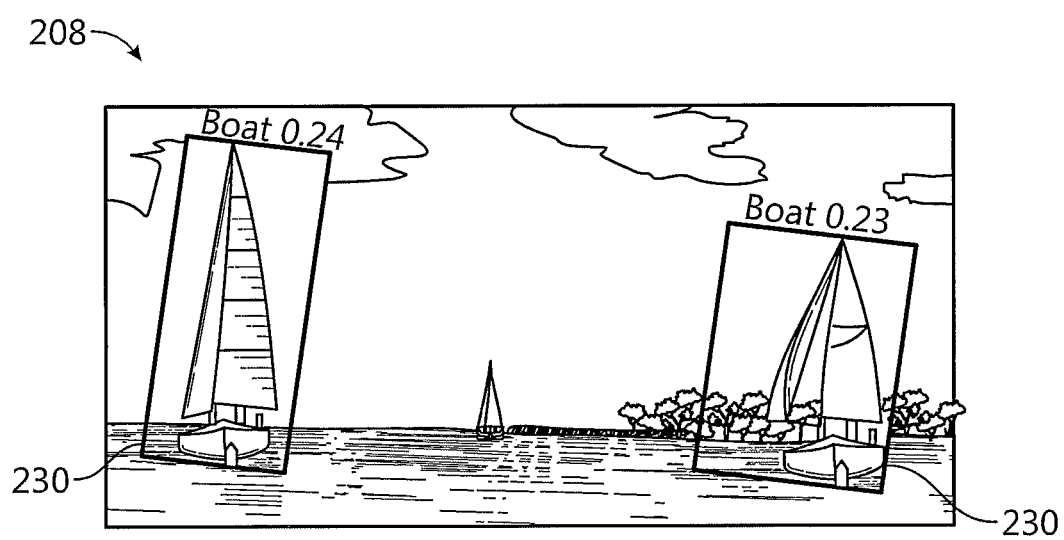

FIGS. 2F-J show display views 205-209 illustrating perimeter sensor data from perimeter ranging system 148, in accordance with an embodiment of the disclosure. For example, display view 205 of FIG. 2F shows an image captured by camera 216 of a docking area including dock 222 after processing by image analyzer 270. As shown in display view 205, dock 222 has been identified (e.g., by co-processor 270b) and highlighted with a green overlay (e.g., provided as analytics metadata by video processing IC 270a) to help a user guide mobile structure 101 into dock 222. Display view 206 of FIG. 2G shows an image captured by camera 212 of a docking area including dock 222 and watercraft 230 after processing by image analyzer 270, which includes bounding boxes and identifiers (e.g., textual names and/or ranges) associated with dock 222 and watercraft 230. Display view 207 of FIG. 2H shows a thermal image captured by camera 212 of two watercraft 230 after processing by image analyzer 270 to increase contrast and/or provide identifiers for watercraft 230. Display view 208 of FIG. 2I shows a visible spectrum image captured by camera 212 of two watercraft 230 after processing by image analyzer 270, which includes bounding boxes and identifiers associated with detected watercraft 230.

Figure 2J:
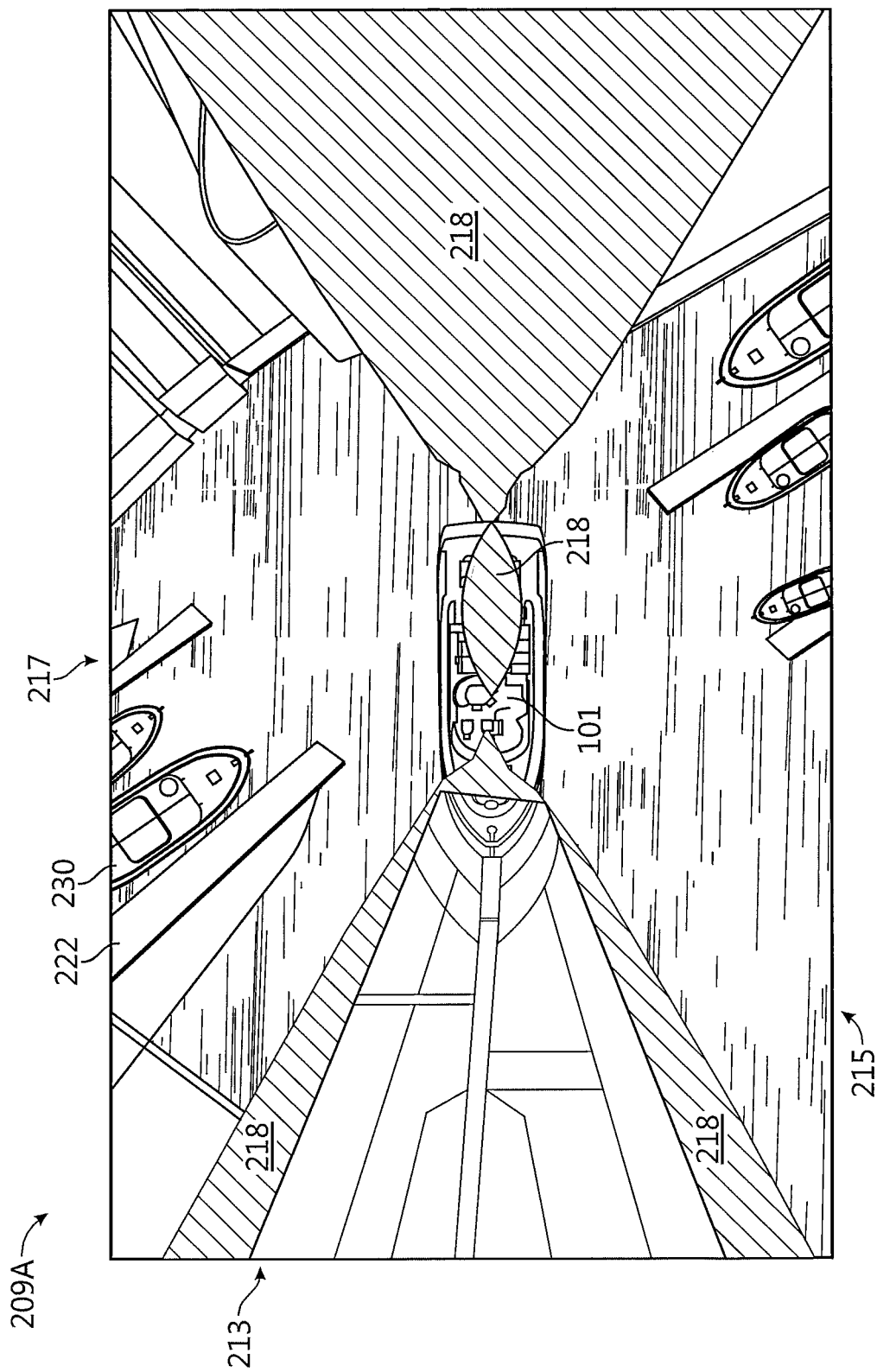

As noted herein, a synthetic elevated view/virtual drone view, may be generated from images captured by cameras mounted to various portions of mobile structure 101, such as a gunwale, bridge, mast, and/or other portion of mobile structure 101, and a fused or stitched version of such images may be projected onto a flat surface and rendered in a display of user interface 120. For example, display view 209 of FIG. 2J shows a combination of visible spectrum images captured by cameras 212, 214, and 216 coupled to mobile structure 101 and projected/mapped onto a (virtual) flat surface and rendered for display (e.g., by image analyzer 270 and/or user interface 120). As shown in FIG. 2J, display view 209A shows mobile structure 101 attempting to dock at dock 222 while navigating to avoid collision with other watercraft 230 and/or other structures identified within FOVs 213, 215, and 217. Display view 209A also shows various un-imaged areas 218 (e.g., where the various FOVs fail to overlap), which may in some embodiments be left blank or supplemented with prior-image data (e.g., captured while mobile structure 101 was at a different position or orientated differently) and/or other perimeter ranging system data, such as above or below water sonar data indicating the relative position of an object surface or underwater hazard within un-imaged areas 218.

Another example is provided by display view 209B of FIG. 2K, which shows a combination of visible spectrum images captured by cameras 212, 214, and 216 coupled to mobile structure 101 and projected/mapped onto a (virtual) flat surface and rendered for display (e.g., by image analyzer 270 and/or user interface 120), but where FOVs 213, 215, and 217 corresponding to images captured by cameras 212, 214, and 216 are processed to generate a substantially isomorphic representation of at least the perimeter of mobile structure 101. Such processing may include, for example, linear and/or non-linear unwarping/dewarping, scaling, translating, cropping, resampling, image stitching/combining, and/or other image processing techniques configured to generate an isomorphic representation of at least the perimeter of mobile structure 101 from images captured by cameras 212, 214, and 216, for instance, and/or to minimize the size and/or prevalence of un-imaged areas 218.

As shown in FIG. 2K, display view 209B shows mobile structure 101 docked at dock 222 next to other watercraft 230 and/or other structures identified within FOVs 213, 215, and 217. Display view 209B also shows various un-imaged areas 218 (e.g., where the various processed FOVs fail to overlap), which may in some embodiments be left blank or supplemented with prior-image data and/or other perimeter ranging system data and/or other ranging system data.

To simplify installation and setup of perimeter ranging system 148, and generate display views 209A, 209B, and/or other display views described herein, the various camera angles can be automatically calibrated/derived/determined by capturing images while maneuvering mobile structure 101 through 360° while close to dock 222, and the resulting set of images can be used to self-calibrate for camera height, distance from a centerline of mobile structure 101, and/or other operating and/or mounting characteristics of the cameras. For example, the calibration of the cameras may be performed automatically; when the boat executes a 360° turn in a crowded environment such as a marina or port, the images that sweep past the different cameras move out of one field of view and into the next in a manner which is only consistent with the yaw rate data (e.g., from orientation sensor 140) and a single set of calibration parameters for the cameras. In alternative embodiments, range may be measured, calibrated, and/or adjusted using motion of mobile structure 101 and various image analytics applied to images captured by perimeter ranging system 148. While multiple cameras can be used in stereo to determine ranges, such arrangements undesirably add to system cost and complexity.

In some embodiments, cameras 212, 214, and 216 may be characterized by a manufacturer in a lab prior to use, or may be characterized by a user and a known geometry reference (e.g., a poster of images with known geometries placed a known distance and orientation relative to the camera), and the resulting camera characteristics may be used to determine unwarping parameters for an unwarping process that, for example, removes various types of image distortions introduced by lenses and/or other physical characteristics of cameras 212, 214, and 216. Each camera may include an orientation sensor and/or accelerometer or similar sensor configured to provide an elevation (e.g., downward pointing angle) and/or an azimuth (e.g., relative heading/bearing) corresponding to respective FOVs 213, 215, and 217, or approximate elevations and/or azimuths may be assumed for a typical mounting (e.g., 45 degree negative elevation and +−110 degree relative azimuth for lateral view cameras 214 and 216, 10 degree negative elevation and zero degree relative azimuth for forward view camera 212). Similarly, other installation geometries can be estimated or assumed (e.g., all cameras mounted at an altitude of 3 meters, forward view camera 212 2 meters longitudinally in front of lateral view cameras 214 and 216, lateral view cameras 214 and 216 3 meters laterally apart from each other).

From these measured and/or assumed/estimated installation geometries, an initial or estimated image stitching, unwarping, and/or other processing may be performed to generate the isometric representation of at least a perimeter of mobile structure 101. Such initial or estimated isometric mapping may be modified and/or refined based on isometric registration of structures imaged by spatially overlapping FOVs and/or time-spaced overlapping FOVs (e.g., as mobile structure maneuvers and/or rotates through a scene). The magnitudes of such adjustments to the isometric mapping may be adjusted over time (e.g., by a multiplicative coefficient) and be fairly aggressive initially (e.g., coefficient close or equal to 1) but taper off based on the number of co-registered structures, time of calibration, and/or other calibration parameters (e.g., coefficient trending to a value between 0.1 and zero).

Autonomous navigation control (e.g., including docking assist and/or collision avoidance) requires techniques for defining target docking positions and/or orientations, for example, and/or target navigation or docking tracks (e.g., a waypoint defined path from a current position and orientation of mobile structure 101 to a target navigation or docking position and/or orientation, which may include a series of waypoints indicating corresponding series of positions and/or orientations for mobile structure 101). Such target navigation or docking tracks may include one or more specified target linear and/or angular velocities along the track, target transit times, target mobile structure orientations, and/or other navigation or docking track characteristics, for example, which may be selected by a user and/or specified by various navigation or docking safety parameters (e.g., regulations or user-supplied limits on maneuvers within a navigation or docking area). Thus, a navigation control (e.g., including docking assist and/or collision avoidance) user interface should include display views allowing a user to specify target navigation or docking positions and/or orientations, and/or target navigation or docking tracks, as described herein.

In some embodiments, user interface 120 and/or controller 130 may be configured to render, on a display of user interface 120, a selectable image or icon representing at least the profile of mobile structure 101 over a navigational chart of a docking area and/or a camera image of an area surrounding mobile structure 101 and including the docking area, captured by perimeter ranging system 148. Such icon may be moved across the chart or image by user input (e.g., user touch, joystick input, mouse input, and/or other user input) to indicate a target docking track and/or a target docking position and/or orientation within the generated view of the docking area. Typically, a user would manually steer mobile structure 101 to a point in clear view of a target berth, then stop mobile structure 101, and then engage an autonomous docking mode. The docking assist system may be configured to hold the position and/or orientation of mobile structure 101 while the user defines the target docking track and/or a target docking position and/or orientation, which may in some embodiments be performed using a two finger slide/rotate of the icon/image corresponding to mobile structure 101 through the docking area as presented by the chart and/or image of the docking area. In some embodiments, such movement of the icon/image within the rendered view relative to various navigation hazards may be limited by a predefined minimum safety perimeter, as disclosed herein, which may be set to approximately 20 cm.

Advantageously, embodiments provide a user substantial influence over docking maneuvers; for example, the user may choose when to engage the autonomous docking process (e.g., the user may define both a starting point and an ending point of the docking maneuver). A user wishing to exercise relatively tight control over the starting point can engage the autonomous docking process closer to the target docking position, whereas a user wishing less control over the process could engage earlier, thereby allowing the docking assist system to manage more of the maneuver. In some embodiments, a safety limit may limit how early the process can be engaged, such as no further than 20 boat lengths from the target docking position.

In addition to receiving selection of target navigation or docking position, orientation, and/or track, system 100 may be configured to adjust and/or reroute a selected target navigation or docking position, orientation, and/or track according to navigation hazards detected along the navigation or docking track by perimeter ranging system 148 and/or any external disturbances (e.g., wind and/or water currents affecting navigation of mobile structure 101). For example, system 100 may be configured to maintain a safety perimeter to navigation hazards and/or other objects, which may be speed dependent. In some embodiments, prevailing wind and water currents may be stronger than the maximum thrust of thrust maneuver system 172, for example, or thrust maneuver system 172 may be absent, and system 100 may be configured to maintain a relatively high velocity using propulsion system 170 until relatively close to a target position, then use a combination of reverse thrust provided by propulsion system 170, steering input provided by steering actuator 150, and/or supplemental vectored thrust provided by optional thrust maneuver system 172 to slow and/or orient mobile structure 101 just before entering the target position and/or orientation.

In various embodiments, system 100 may be configured to compensate for slip dynamics of mobile structure 101 (e.g., unlike road vehicles that follow a prescribed direction of travel, watercraft slip sideways when they turn and this leeway effect can be significant at low speeds and very significant for power boats which have almost no keel) and/or for other operating characteristics of mobile structure 101, such as the effects of prop torque, which tends to turn a watercraft. In addition, a target track for a powered watercraft will typically be different from the target track for a sailing watercraft: a sailboat can aim at the docking pontoon and turn at the last second because its keel substantially prevents sideslip; a powerboat should turn a few seconds earlier because its sideslip is typically significant and can cause the powerboat to drift sideways at the docking pontoon and potentially cause damage to its hull; a zodiac should tend to aim 45° to the side of a docking pontoon, coasting in during the last 5 or so seconds, and applying a burst of full reverse helm in the last 2 or so seconds, to slow the zodiac and tuck its stern into the docking berth.

The simplest target navigation or docking tracks are for mobile structures with thrust maneuver systems providing full control of sideways and rotational thrust. However, in the general case, a navigation or docking track generation process is non-linear and cannot be solved simply. As such, embodiments disclosed herein may be configured to execute a control loop including a non-linear dynamic model of mobile structure 101, including navigation control system 190, sideslip characteristics, and wind and water current disturbances, and computing such model iteratively with respect to a starting state of mobile structure 101, a target navigation or docking position and orientation, and known navigation hazards. Such model provides target linear and angular velocities along the target docking track and can anticipate slide-slip.

Embodiments disclosed herein may also designate a target navigation or docking track according to a set of predefined navigation or docking track patterns that are linked to a specific mobile structure type. Such patterns may be adjusted to fit a particular navigation or docking area and/or circumstance. Such track patterns may in some embodiments be learned from a user providing user input during a manual docking process, such as part of a training process; this can be done in real time or offline from a large database of recorded docking maneuvers. More specifically with regard to a navigation control or docking assist user interface, docking assist system 100 may be configured to receive a target navigation or docking track as user input provided to user interface 120 as the user drags the icon/image of mobile structure 101 across a rendered chart or image of a navigation or docking area to a target navigation or docking position.

A particular selected target navigation or docking operation (e.g., including a target navigation or docking position, orientation, and/or track) may or may not be achievable given the available maneuvering capability of mobile structure 101 and/or a distribution of navigation hazards and/or corresponding navigation or docking safety parameters. System 100 may be configured to evaluate a selected target navigation or docking operation and allow or confirm or engage such selection only if the operation is achievable. To evaluate a selected target navigation or docking operation, system 100 may be configured to simulate the target docking process using a dynamic model of the navigation or docking process, including maneuvering characteristics of mobile structure 101 and any navigation hazards and/or external disturbances, as described herein. Such dynamic model may be used to simulate and thereby evaluate a selected target track, for example, and to automatically determine a target track (e.g., based, at least in part, on a selected target position and/or orientation). Moreover, such dynamic model may be used to evade a navigation hazard and/or to compensate for changing external disturbances.

For assisted docking, as opposed to fully autonomous docking, a user may provide primary control of maneuvering of mobile structure 101 through user interface 120 (e.g., a helm or joystick, for example), and system 100 may be configured to adjust and/or modify such user input to facilitate navigation or docking of mobile structure 101, such as by providing for intuitive control of maneuvering of mobile structure 101 and/or by overriding or modifying user input that would otherwise risk damage caused by impact with navigation hazards.

For example, docking assist system 100 may be configured to convert a standard joystick thrust controller (e.g., providing forward, backward, sideways, and/or rotational thrust in response to user input manipulating the joystick) into a joystick velocity controller (e.g., providing a linear and/or angular velocity in response to user input manipulating the joystick). Such conversion results in a controller that is analogous to cruise control in a road vehicle where the throttle pedal is switched out for a speed demand. Such conversion may be based on known characteristics of mobile structure 101 and navigation system 190, for example, or may be based on system characteristics derived from a calibration process, such as a sea trial, where the control signals are provided to navigation control system 190 and the resulting motion of mobile structure 101 and other effects are measured (e.g., using sensors 140-148), creating calibration parameters linking control signal input and motive reaction.

A sideslip factor for mobile structure 101 may also be determined based on such sea trial calibrations, for example, or may be provided by a manufacturer. Such calibration processes would typically be performed while perimeter ranging system 148 is active and able to operate sufficiently well to estimate velocity based on perimeter sensor data corresponding to nearby navigation hazards, for example, but where mobile structure 101 is not at risk of collision with navigation hazards. Wind and/or water currents, and/or other external disturbances, may be estimated using such systems, such as by placing docking assist system 100 in a hover mode (e.g., by providing user input corresponding to a dead stick input to user interface 120), where the target linear and/or angular velocities are substantially zero, such as prior to engaging autonomous docking, as described herein. Any thrust necessary to keep mobile structure 101 from moving may be attributed to an appropriate external disturbance (e.g., as modulated by other sensors, such as speed sensor 142).

In related embodiments, docking assist system 100 may be configured to provide "brakes" for mobile structure 101 corresponding to such hover mode, where the system uses navigation control system 190 to keep mobile structure substantially still, even while buffeted by various external disturbances. For example, docking can be frightening, especially so when wind or water currents are strong. Aside from anchors, which are severely limited in application when attempting to maneuver into a docking area, there are no true brakes for watercraft, and so it often requires continual skillful thrust control to hover a watercraft using conventional navigation controllers. By converting the thrust controller into a velocity controller, as described herein, embodiments allow a user to hover or halt mobile structure 101 simply by letting go of the joystick. In some embodiments, controller 130 may be configured to limit a linear and/or angular velocity generated by docking assist system 100 to a value that can be sufficiently counteracted to hover mobile structure 101 within a predefined period of time (e.g., 2-3 seconds) and/or a predefined linear and/or angular motion of mobile structure 101 (e.g., 0.5 meters and/or 1 degree of rotation). Such control is more intuitive, particularly for novice users, and provides an additional safety measure when utilizing docking assist, where fine navigation control can be critical.

Figure 4:
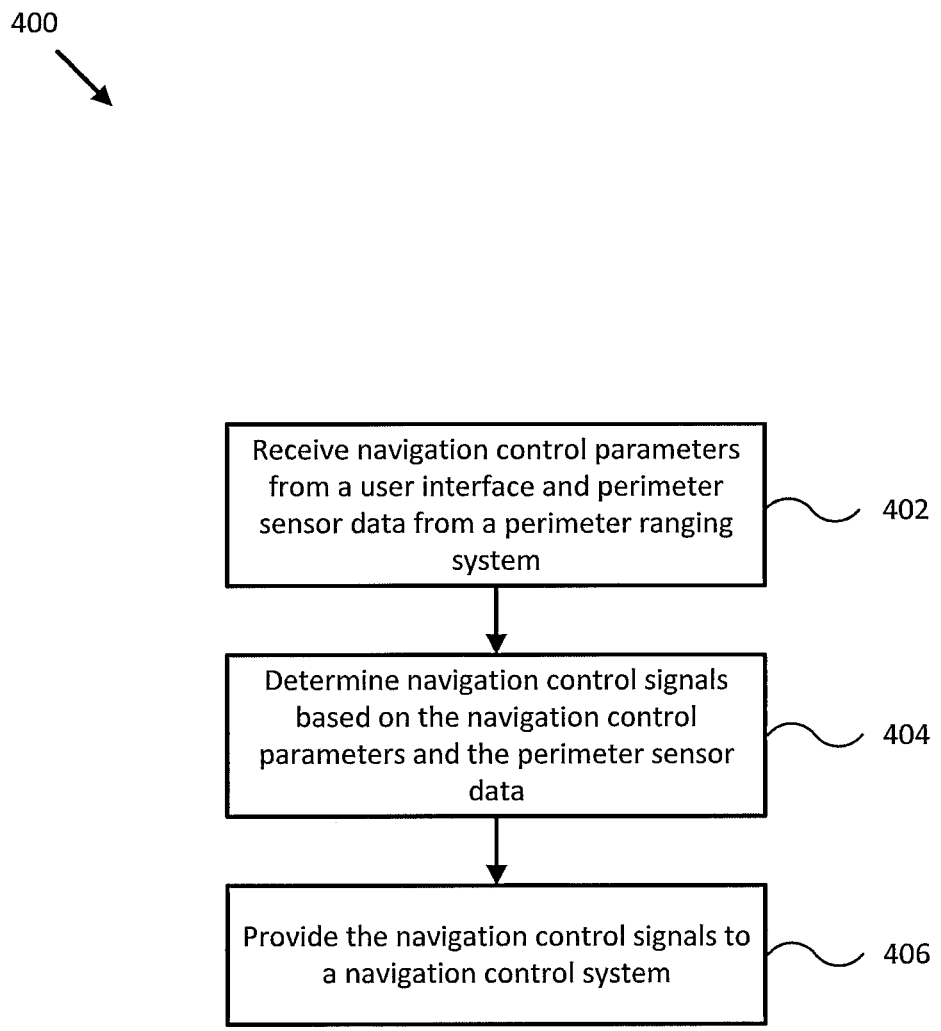
FIG. 4 illustrates a flow diagram of a process to provide autonomous and/or assisted navigational control including collision avoidance for a mobile structure in accordance with an embodiment of the disclosure.

In various embodiments, conversion of a thrust controller into a velocity controller may be achieved using any of the systems and methods described in International Patent Application No. PCT/US2018/037953 filed Jun. 15, 2018 and entitled "AUTONOMOUS AND ASSISTED DOCKING SYSTEMS AND METHODS," which is hereby incorporated by reference in its entirety, and particularly control loop 400 of FIG. 4A and/or other elements described in relation to FIGS. 4A-25 of International Patent Application No. PCT/US2018/037953. For example, such control loops and methods may be performed by controller 130 processing and/or operating on signals received from one or more of sensors 140-148, navigation control system 190, user interface 120, and/or other modules 180. Such conversions may be based, at least in part, on a maximum linear and/or angular thrust for navigation control system 190 and/or thrust maneuver system 172, for example, such that the maximum linear and/or angular velocity is limited by the time or distance it would require to hover mobile structure 101 given maximum counteracting linear and/or angular thrust, as described herein. In other embodiments, controller 130 may be configured to receive a time series of target linear and/or angular velocities corresponding to a target track and/or a target position and/or orientation, as described herein, which may be adjusted to evade one or more navigation hazards.

In other embodiments, a control loop may be configured to receive perimeter sensor data (e.g., imagery from cameras, sensor data from ultrasonic sensors and/or vertically steered radar assemblies) and generate positive and negative velocity limits that are passed to a joystick attenuator to limit the joystick demand, such as to provide virtual bumpers or spatial safety margins about the perimeter of mobile structure 101, as described herein with regard to attenuation of joystick, velocity, and/or thrust demand to help reduce risk of collision with a navigation hazard or obstacle while performing docking assist and/or other navigation maneuvers (e.g., in accord with the "attenuation principal," as described more fully herein).

For example, controller 130 may be configured to receive perimeter sensor data in the form of imagery provided by cameras 212, 214, and/or 216, determine that a navigation hazard is present and within a safety buffer zone of a starboard perimeter of mobile structure 101, and generate and provide positive and/or negative velocity limits (e.g., linear and/or angular velocity limits) that are selected to limit and/or zero out joystick or thrust demand (e.g., user supplied demands) tending to propel mobile structure 101 such that its perimeter approaches the detected navigation hazard. Controller 130 may be configured to generate such velocity limits based, at least in part, on perimeter sensor data and/or (optionally) measured velocities/rates of mobile structure 101.

In accordance with various related embodiments, a navigation control (e.g., including docking assist and/or collision avoidance) system may be configured to provide virtual bumpers or spatial safety margins about the perimeter of mobile structure 101 as the mobile structure navigates. For example, system 100 may be configured to attenuate joystick velocity demand upon the detected approach of or to a navigation obstacle or hazard (e.g., to reduce a component of the velocity of mobile structure 101 towards the detected hazard). Such attenuation may be greater as distance to the detected hazard decreases, and, in some embodiments, the velocity demand may be set to zero once the distance to the hazard is within a preset minimum safety margin distance or virtual bumper size (e.g., 20 cm, which may correspond to a typical stepping-off distance). In further embodiments, the velocity demand may be increased in a direction opposite the closing direction to the navigation hazard in order to maintain and/or increase the minimum safety margin distance, such as if no other objects block such movement of mobile structure 101.

Typically, a user providing manual input to a joystick will always be allowed to joystick away from such objects (e.g., without attenuation), but will be subject to such attenuation when joysticking towards objects within a navigation safety distance (e.g., a distance relative to the perimeter of mobile structure 101, larger than the minimum safety margin distance, selected to allow time and space for mobile structure to evade collision with the navigation hazard). Such navigation safety distance may be adjusted (e.g., increased, decreased, shaped) according to the velocity of mobile structure 101, the navigation hazard, and/or the relative velocity between the two. Certain embodiments provide safer navigation without increasing risk of collision by only attenuating user velocity input; velocity demand is not created, and so system 100 cannot actively steer or propel mobile structure 101 towards a collision and instead can only work to keep a user from doing so.

A risk for autonomous navigation and/or docking is that the system drives the boat into an obstacle, either because an obstacle has not been detected, or because of a system fault. An "attenuation principle" can be applied to operation of docking assist system 100 to eliminate the risk of system 100 driving mobile structure 101 into an obstacle. This principle is defined such that detection of an obstacle cannot lead to velocity demand, but instead leads to the attenuation of a user's joystick or other manual user interface input, for example, or an attenuation of some other source of velocity demand (e.g., a docking assist and/or navigation control signal/demand).

For example, the output of the perimeter ranging system 148 can include a signal (or set of signals, forwards/sideways/rotation) in the range 0 to 1, where 1 implies leave the users velocity demand intact, and 0 means apply zero velocity demand (brakes or hover mode) regardless of the user's demand. Such an attenuation signal cannot cause a vessel crash, but it can frustrate the user by preventing velocity demand, and it can fail to prevent a user induced crash. In various embodiments, the attenuation signal/gain adjustment is only allowed to fall below 1 where the user demands velocity towards an obstacle. Velocity demand away from an obstacle will never cause attenuation. Sliding along an obstacle is therefore possible, for example if a vessel is sliding into a dock, and the virtual bumper is close to touching down one side, then the component of sideways velocity demand may be attenuated to 0 whereas the component of forwards velocity demand would not be restricted until the bow approaches the front virtual bumper, so the vessel may continue following the path of least risk of collision along the direction of the dock.

In general, docking assist system 100 may be configured to identify and avoid navigational hazards, while ignoring objects that do not present a navigational hazard. As such, embodiments may be implemented with artificial intelligence (AI) systems and techniques to differentiate objects like sea gulls or floating debris that do not present a navigational hazard (indeed trying to avoid them could be dangerous) from, for example, the corner of a kayak, which could be of a similar size and color but should be avoided. Such intelligent systems/techniques may help determine a target pathway from a current position to a target location, avoiding obstacles, and taking into account the geometry and safety zone corresponding to mobile structure 101.

In additional embodiments, docking assist system 100 may be configured to provide collision avoidance while substantially adhering to the provided user input. For example, embodiments of the present disclosure provide full control over the path mobile structure 101 takes and provide the ability to stop at any time. In addition, by monitoring a perimeter about mobile structure 101, embodiments are able to modify and/or override user input to prevent a collision, such as if a user overlooks a detected navigation hazard, tries to approach a dock at too high a speed, or otherwise makes a navigation mistake.

When controlling a mobile structure's velocity to prevent collision with a navigation hazard, there is high complexity due to the potentially complex mobile structure and hazard/obstacle shapes, and the multiple degrees of freedom of motion (lateral, longitudinal and rotational velocities). Embodiments described herein can project the mobile structure's motion based on control system or user demand and current momentum and/or environmental conditions, and then use information from a perimeter ranging system to predict potential collisions at a future time. If a potential collision is detected, then the system can iterate through multiple scenarios where control input (velocity demand) is attenuated in one or multiple components/dimensions until the future projections are collision free. The resulting set of collision free options may then be examined and a scenario determined to minimize deviation from the original demand. In the case of assisted docking or maneuvering, the system may be configured to adhere as closely as possible to a user's manually supplied demand while avoiding collision in order to minimize excursion from the skipper's navigational directives during what is typically a circumstance requiring fine navigational control under relatively tight navigation tolerances.

In particular, in the context of assisted docking, system 100 may be configured to assist a skipper by slowing or stopping mobile structure 101 if it gets too close to a dock or other hazard or obstacle with too much closing velocity. However, there are situations where velocity in one direction is dangerous, but in another direction is desirable. For example, when coming into a narrow gap between a pontoon on one side and a neighboring vessel on the other, with a strong wind or tide, it is best to maneuver with reasonable speed in the forward sense, even though the gap to the side may be only a half a meter or less. Therefore, an assisted docking system should typically be configured to focus on attenuating or controlling only the component of the mobile structure's velocity in the "dangerous" direction. Under many common situations, however, it is difficult and non-trivial to determine which directions of motion are dangerous and should be subject to attenuation, and which are safe, all within a short enough time period to eliminate risk of collision.

In various embodiments, system 100 may be configured to generate a 2D occupancy map identifying the positions of all obstacles higher than the water surface and representing a potential collision with mobile structure 101. For example, such 2D occupancy map or grid of voxels (e.g., when displayed to a user) may have a resolution of approximately 0.1 m, depending on the resolution of perimeter ranging system 148 and/or a perspective of the occupancy map as displayed to a user of system 100. System 100 may be configured to represent a perimeter of mobile structure 101 using a 2D polygon that identifies the extents of mobile structure 101 that should never collide with an obstacle. The same or a different 2D polygon or polygon offset may be used to represent the virtual bumper about mobile structure 101 (e.g., typically a 0.5 m spatial buffer about the perimeter of mobile structure 101). In various embodiments, system 100 may be configured to perform collision detection based, at least in part, on the virtual bumper perimeter and perimeter ranging data provided by perimeter ranging system 148.

In a particular embodiment, a state-space model of the system comprising of the response of the boat to a skipper command may be generated in the form:

$\dot{x}(t) = f(x(t), \tau(t))$; where $x(t) = [x_b, y_b, \psi, \dot{x}_b, \dot{y}_b, \dot{\psi}]^\tau$ is the planar state vector of mobile structure 101 representing the position of mobile structure 101 and the corresponding time derivatives at time t in the coordinate frame of mobile structure 101.

In the embodiment described herein, $x_b$ represents the surge (longitudinal motion), $y_b$ represents the sway (lateral motion), and $\psi$ represents the yaw of mobile structure 101. Altitude is assumed constant with this planar state vector, which corresponds to relatively slow maneuvering in relatively calm waters. A similar assumption can be used with respect to terrestrial vehicles under similarly tepid conditions. In other embodiments, such model and state vector may be adjusted to compensate for vertical motion as well (e.g., a 3D state vector with three linear components, three angular components, and their time derivatives).

f is a non-linear function configured to model the evolution of the system (e.g., also referred to a non-linear evolution model) based on an input vector (e.g., three component thruster demand) $\tau(t) = [\tau_u, \tau_v, \tau_\omega]^\tau$ in the coordinate frame of mobile structure 101, where $\tau_\omega$ is the demand in sway, $\tau_v$ is the demand in surge, and $\tau_\omega$ is the demand in yaw. In general, f may be configured to model the behavior of mobile structure 101 when subjected to the various thrust or velocity demands, for example, and may be modified to model the behavior of mobile structure 101 when additionally subjected to external disturbances, such as tides, currents, and wind. x(t) may be estimated using a Kalman filter type observer and position and/or orientation measurements provided by sensors 140-148.

A projected occupancy for mobile structure 101 is generated by setting a projection interval $T_{proj}$ during which the three-component thruster demand is set as constant, such that $\tau(t) = \tau(t_0) \forall t \in [t_0, t_0 + T_{proj}]$.

Using the non-linear evolution model for mobile structure 101 f, the future set of positions and orientations of mobile structure 101 $\{x(t)\}_{t \in [t_0, t_0 + T_{proj}]}$ can then be predicted for a given thruster demand/joystick position (e.g., which may correspond to a thruster controller or a velocity controller, as described herein).

Any discretization method can be used to convert the continuous state space provided by the non-linear evolution model to a discrete state-space. For example, a Euler discretization method would be in the form: $x(k+1) = x(k) + \dot{x}(t) dt = x(k) + f(x(k), \tau) dt$; where dt is the sampling time used between two projected occupancies for mobile structure 101.

The transform of the velocity vector from the coordinate frame of mobile structure 101 to an absolute coordinate frame may be performed by applying a yaw rotation matrix, such as:

$$R(\psi) = \begin{bmatrix} \cos(\psi) & -\sin(\psi) & 0 \\ \sin(\psi) & \cos(\psi) & 0 \\ 0 & 0 & 1 \end{bmatrix}$$

The location and orientation of the virtual bumper perimeter (e.g., as represented by a 2D polygon) at any given time in the projection time interval $[t_0, t_0+T_{proj}]$ may be determined by applying the corresponding translations and/or rotations to the original virtual bumper perimeter polygon, as determined through use of the non-linear evolution model for mobile structure 101 $f$. In various embodiments, the 2D occupancy map may be generated in an absolute coordinate frame, for example, or in relative coordinate frame corresponding to mobile structure 101.

In some embodiments, system 100 may be configured to determine a projected collision detection area for mobile structure 101 within the 2D occupancy map, corresponding to the projection time interval $[t_0, t_0+T_{proj}]$ (e.g., for all projected collision detection areas) and a selected thruster demand, by determining a set of positions and orientations of the virtual bumper polygon at each discrete time within the projection time interval (e.g., for a given starting state), and combining the extents of a corresponding set of virtual bumper polygons by overlapping them within the 2D occupancy map. Voxels within the projected collision detection area may be identified as projected collision detection voxels (e.g., for that projection time interval and for that selected thruster demand).

A projected collision risk estimation collision($\tau$) (e.g., a measure of the magnitude and/or significance of any detected collisions, for a particular thruster demand $\tau$) may then be determined based on identifying projected collision detection voxels that are also obstacle voxels (e.g., positions within the 2D occupancy map including at least a portion of an obstacle or hazard detected by perimeter ranging sensor 148). In some embodiments, such projected collision risk estimation may be implemented as a simple count of overlapping projected collision detection voxels and obstacle voxels (e.g., a count of collision voxels). In other embodiments, such projected collision risk estimation may be implemented as a weighted count, where each collision voxel is weighted according to a distance to a nearest extent of mobile structure 101, for example, a measurement of how stationary the corresponding obstacle is, and/or other characteristics of the obstacle and/or motion of mobile structure 101. Other combination methods are contemplated.

A thruster demand cost function in the form cost($\tau$)=$\alpha \|\tau - \tau_0\|_2$+collision($\tau$) may be used to determine a particular collision avoidance thruster demand that minimizes the risk of collision (e.g., the thruster demand $\tau$ that minimizes the thruster demand cost function). In various embodiments, each thruster demand in the set of tested thruster demands $\tau$ are selected so as to respect the attenuation principle, as described herein, which means that all tested thruster demands $\tau$ must be smaller in absolute value and of the same sign as the user command:

$$\begin{cases} |\tau_u| < |\tau_{u_0}| \\ |\tau_v| < |\tau_{v_0}| \\ |\tau_\omega| < |\tau_{\omega_0}| \end{cases} \text{ and } \begin{cases} \text{sign}(\tau_u) = \text{sign}(\tau_{u_0}) \\ \text{sign}(\tau_v) = \text{sign}(\tau_{v_0}) \\ \text{sign}(\tau_\omega) = \text{sign}(\tau_{\omega_0}) \end{cases};$$

where $\tau_0(t_0)=[\tau_{u_0}, \tau_{v_0}, \tau_{\omega_0}]^\tau$ is the original user-applied thruster demand. In various embodiments, a brute force method, an optimization scheme, such as a simulated annealing method, and/or other techniques may be used to determine the collision avoidance thruster demand minimizing the thruster demand cost function.

A supplemental and/or alternative technique involves approximating the non-linear evolution model for mobile structure 101 $f$ using a linear equation $x(k+1)=[A]x(k)+[B]\tau$; where [A] and [B] represent matrix intervals (in an interval-analysis sense) encompassing the system response. For example, for a first order system with no coupling and considering $x_b$ only:

$$\dot{x}_b(t) = -\frac{1}{T}x_b(t) + \frac{K}{T}\tau_u$$

$$x_b(k+1) = \left(1 - \frac{1}{T}dt\right)x_b(k) + \frac{Kdt}{T} = Ax_b(t) + B\tau_u$$

With a bounding interval for K and T, an interval of all the possible values of $x_b(k+1)$ given $x_b(k)$ and $\tau_u$ may be determined. This can be extended to the other axes, thereby generating a bounding polygon containing the virtual bumper extents, which can be propagated through $T_{proj}$, and on which the cost function can be calculated and minimized to determine the collision avoidance thruster demand, as described herein.

As noted herein, the collision avoidance may be performed using velocity demands (e.g., as provided by a velocity controller) in place of thruster demands. Moreover, while this technique is described with respect to voxels, the same technique may be used with the projected collision detection area and obstacles represented by polygons and/or other graphics primitives derived from a perimeter of mobile structure 101, a selected thickness of the virtual bumper, and/or perimeter ranging data provided by perimeter ranging sensor 148.

As an alternative or supplement to the above, particularly in situations where determining the projections and projected collision detection areas and collisions becomes compute intensive, the number of projected collision detection areas, and their constituent projections, may be limited. For example, in one embodiment, the number of projected collision detection areas may be limited to 6 projection "directions" corresponding to positive and negative lateral projections, longitudinal projections, and rotational projections, or a subset of these (e.g., such as omitting the rotation projections), and the number of constituent projections may be limited by adjusting a spatial resolution of each iteration of projection along the selected direction, halting the projections upon reaching a maximum projection displacement (e.g., from the current position of mobile structure 101) and/or a maximum projection iteration number, and/or testing each projection for collision with an obstacle identified within the 2D occupancy map and halting the projections once a projected collision is detected. Each individual projection may be referenced to a coordinate frame of mobile structure 101, for example, or may be referenced to an absolute coordinate frame (e.g., depending on the coordinate frame used to identify obstacles in the 2D occupancy map).

In various embodiments, system 100 may be configured to determine a set of nearest collision distances based on a corresponding set of projected collision detection areas (e.g., one for each projection direction). System 100 may then be configured to determine a corresponding set of clamping velocities (e.g., maximum allowed velocity demands, for each projection direction) based on the determined nearest collision distances and the user-applied velocity demand, wherein the clamping velocities are configured to eliminate the risk of collision with detected obstacles within the applicable time interval. In some embodiments, such relationship may take the form: VelMax=Distance*DistanceGain−AxisVelocity*VelocityGain, where AxisVelocity is the user applied velocity demand corresponding to a particular projection direction, Distance is the nearest collision distance for that projection direction, VelMax is the clamping velocity corresponding to that projection direction, and DistanceGain and VelocityGain are adjustable parameters (e.g., vessel and thrust maneuver system specific parameters, for each projection direction, determined through manufacturer or periodic calibration, such as by sea trial) to ensure collision avoidance is achieved using the applicable maneuvering capability of mobile structure 101. When Distance equals the maximum projection displacement (e.g., corresponding to a maximum projection iteration number), VelMax=AxisVelocity (e.g., the user applied demand is not attenuated in that particular direction).

Figure 3A:
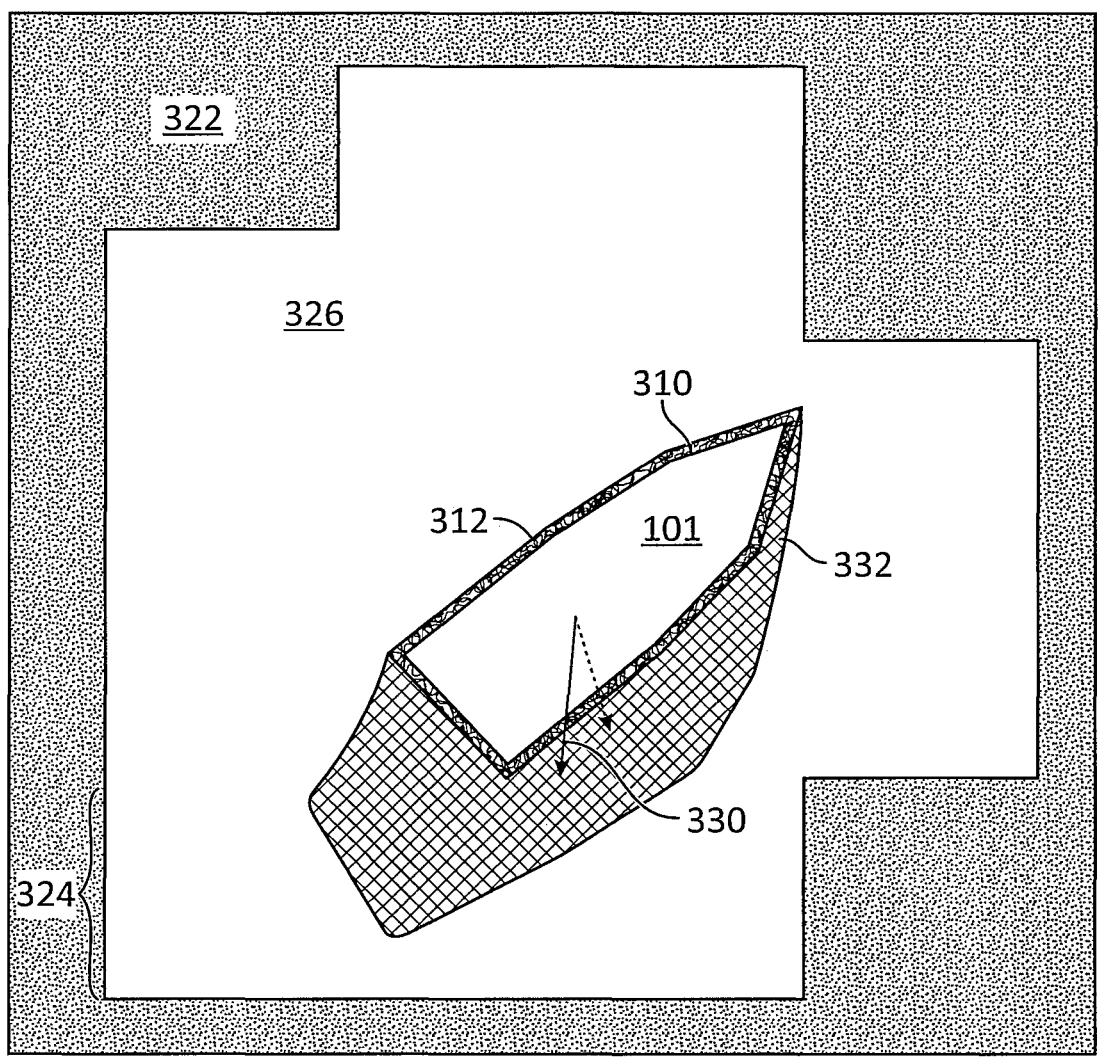
FIGS. 3A-C show display views and target docking positions and orientations for a navigation control (e.g., including docking assist and/or collision avoidance) system in accordance with an embodiment of the disclosure.
Figure 3B:
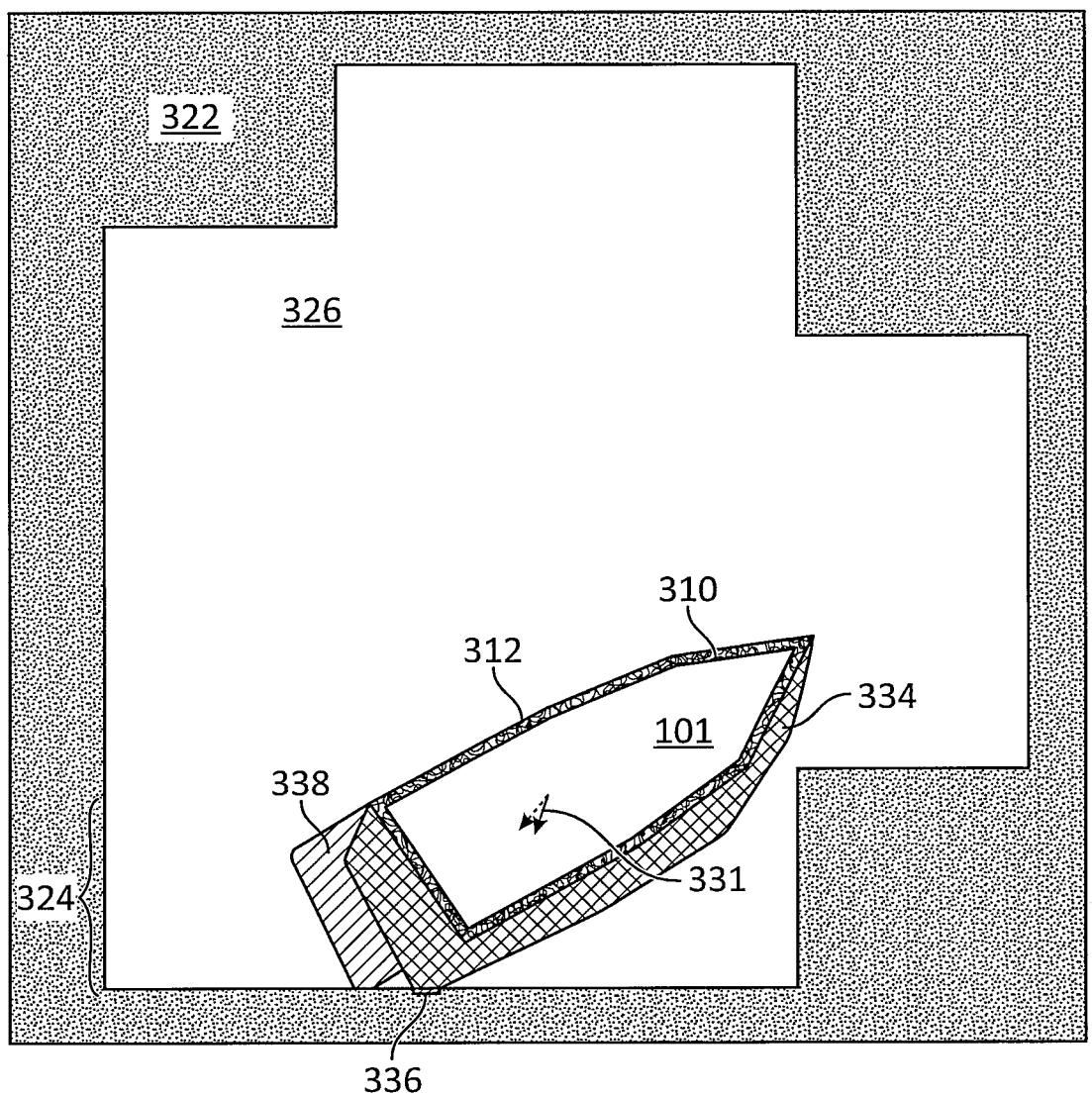
Figure 3C:
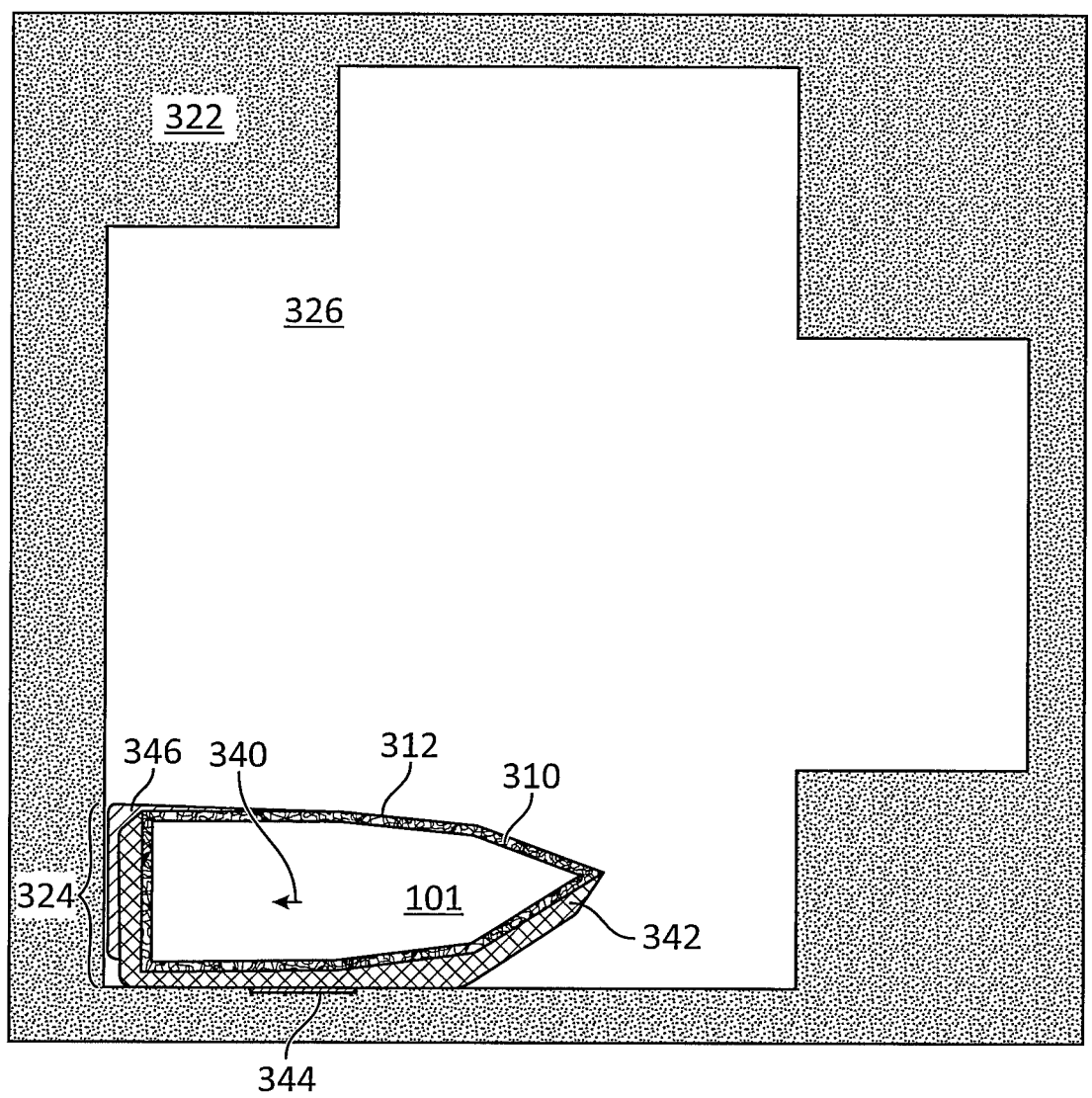

FIGS. 3A-C show display views and target docking positions and orientations for a navigation control (e.g., including docking assist and/or collision avoidance) system in accordance with an embodiment of the disclosure. For example, display view 300 of FIG. 3A shows a simulated chart of a docking area proximate mobile structure 101 and including docks 322, target slip or berth 324, and docking channel (water surface) 326. In display view 300, mobile structure/icon 101 is shown surrounded by perimeter polygon 310, which is itself surrounded by virtual bumper polygon 312. Vector 330 represents the collision avoidance velocity demand determined to minimize the attenuation of the original user applied velocity demand, which is aimed slightly towards an encroaching protrusion of docks 322. Shaded area 332 represents the projected collision detection area associated with collision avoidance velocity demand 330 and is shown without any detected collisions with docks 322.

Display view 301 of FIG. 3B shows the simulated chart of the docking area illustrated in FIG. 3A after a period of time has passed and mobile structure 101 is nearer docks 322 and the user applied velocity demand has not changed (e.g., due to skipper shock or freeze). Additionally, projected collision detection area 334 is shown with collision detections 336 (e.g., overlapping voxels/graphics primitives of projected collision detection area 334 and docks 322). Projected collision detection area 338 illustrates a new calculated minimum to the velocity demand cost function corresponding to collision avoidance velocity demand 331 that lacks collision detections 336. As such, display view 301 illustrates a transition between a prior collision avoidance velocity demand 330 and an updated collision avoidance velocity demand 331.

Display view 302 of FIG. 3C shows the simulated chart of the docking area illustrated in FIG. 3B after a further period of time has passed and mobile structure 101 is nearer docks 322 on two sides and the user applied velocity demand has still not changed (e.g., due to skipper shock or freeze), and where system 100 has almost halted motion of mobile structure 101 within slip 324. Projected collision detection area 342 is shown with collision detections 344 (e.g., overlapping voxels/graphics primitives of projected collision detection area 342 and docks 322). Projected collision detection area 346 illustrates a new calculated minimum to the velocity demand cost function corresponding to collision avoidance velocity demand 340 that lacks collision detections 344. As such, display view 302 also illustrates a transition between a prior collision avoidance velocity demand 331 and an updated collision avoidance velocity demand 340.

FIG. 4 illustrates a flow diagram of a process 400 to provide autonomous and/or assisted navigational control including collision avoidance for a mobile structure in accordance with an embodiment of the disclosure. It should be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems, processes, control loops, and images described in reference to FIGS. 1A-3C, process 400 may be performed by other systems different from those systems, processes, control loops, and images and including a different selection of electronic devices, sensors, assemblies, mobile structures, and/or mobile structure attributes, for example.

In block 402, navigation control parameters are received from a user interface and perimeter sensor data is received from a perimeter ranging system. For example, controller 130 may be configured to receive navigation control and/or docking assist parameters from user interface 120 and perimeter sensor data from perimeter ranging system 142.

In some embodiments, docking assist parameters may include user pilot control signals, such as user input provided to user interface 120 for direct navigational control of mobile structure 101. Such user input may include linear and/or rotational joystick user input, a dead stick user input, and/or other direct user input to user interface 120. In other embodiments, the navigation control and/or docking assist parameters may include a target position and/or orientation for mobile structure 101. For example, controller 130 may be configured to generate a view of a docking area for mobile structure 101 on a display of user interface 120 and receive user input from user interface 120 indicating a target track and/or a target position and/or orientation within the generated view of the docking area.

In block 404, navigation control signals are determined based on navigation control parameters and perimeter sensor data. For example, controller 130 may be configured to determine one or more navigation control and/or docking assist control signals based, at least in part, on the parameters and the perimeter sensor data received in block 402.

In some embodiments, where the navigation control and/or docking assist parameters received in block 402 include user pilot control signals, controller 130 may be configured to determine a target linear and/or angular velocity for mobile structure 101 based, at least in part, on the user pilot control signals and a maximum maneuvering thrust of the navigation control system. Controller 130 may be configured to then determine the one or more navigation control and/or docking assist control signals based, at least in part, on the determined target linear and/or angular velocity, where the one or more navigation control and/or docking assist control signals are configured to cause navigation control system 190 to maneuver mobile structure 101 according to the determined target linear and/or angular velocity. In related embodiments, the user pilot control signals may correspond to a dead stick user input, as described herein, and the target linear and/or angular velocity for mobile structure 101 may be set to zero.

In other embodiments, where the navigation control and/or docking assist parameters received in block 402 include a target docking position and/or orientation for mobile structure 101, controller 130 may be configured to determine a target docking track for the mobile structure based, at least in part, on the target docking position and/or orientation and one or more docking safety parameters corresponding to the target docking track. In further embodiments, the navigation control and/or docking assist parameters received in block 402 may themselves include a target docking track. In various embodiments, controller 130 may be configured to then determine the one or more navigation control and/or docking assist control signals based, at least in part, on the determined or received target docking track, where the one or more navigation control and/or docking assist control signals are configured to cause navigation control system 190 to maneuver mobile structure 101 according to the determined or received target docking track.

In additional embodiments, controller 130 may be configured to determine one or more projected collision detection areas for mobile structure 101 within a 2D occupancy map (e.g., corresponding to a monitoring perimeter of the perimeter ranging system and/or a selected projection time interval), each corresponding to a test thruster or velocity demand. Controller 130 may then determine a collision avoidance thruster or velocity demand based, at least in part, on the one or more projected collision detection areas and the received perimeter sensor data, wherein the one or more navigation control and/or docking assist control signals comprise the collision avoidance thruster or velocity demand and are configured to cause navigation control system 190 to maneuver mobile structure 101 to minimize risk of collision with a navigation hazard identified in the perimeter sensor data.

In further embodiments, controller 130 may be configured to determine a relative velocity of a navigation hazard disposed within a monitoring perimeter of perimeter ranging system 148 based, at least in part, on the received perimeter sensor data, to determine the relative velocity of the navigation hazard towards mobile structure 101 is greater than a preselected hazard velocity limit, and determine the one or more navigation control and/or docking assist control signals based, at least in part, on the determined relative velocity of the navigation hazard, wherein the one or more navigation control and/or docking assist control signals are configured to cause navigation control system 190 to maneuver mobile structure 101 to evade the navigation hazard by decreasing the relative velocity of the navigation hazard towards mobile structure 101.

Controller 130 may also be configured to determine wind and/or water current disturbances affecting navigation of mobile structure 101 and to determine the one or more navigation control and/or docking assist control signals based, at least in part, on the determined wind and/or water current disturbances, wherein the one or more navigation control and/or docking assist control signals are configured to cause navigation control system 190 to compensate for the determined wind and/or water current disturbances while maneuvering mobile structure 101 according to the received docking assist parameters.

In block 406, navigation control and/or docking assist control signals are provided to a navigation control system. For example, controller 130 may be configured to provide the one or more navigation control and/or docking assist control signals determined in block 404 to navigation control system 190. In some embodiments, navigation control system 190 may include one or more of steering actuator 150, propulsion system 170, and thrust maneuver system 172, and providing the navigation control and/or docking assist control signals to navigation control system 190 may include controlling steering actuator 150, propulsion system 170, and/or thrust maneuver system 172 to maneuver mobile structure 101 according to a target linear and/or angular velocity or a target docking position and/or orientation corresponding to navigation control and/or docking assist parameters received in block 402.

For example, controller 130 may be configured to control steering actuator 150, propulsion system 170, and/or thrust maneuver system 172 of mobile structure 101 to generate a target linear and/or angular velocity for mobile structure 101 identified in the navigation control and/or docking assist parameters provided in block 404. If the target linear and/or angular velocity is zero (e.g., corresponding to a dead stick user input), then the navigation control and/or docking assist control signals may be configured to counteract any detected motion of mobile structure 101, including motion caused by various external disturbances, as described herein. In another example, controller 130 may be configured to control steering actuator 150, propulsion system 170, and/or thrust maneuver system 172 of mobile structure 101 to follow a target docking track to a target docking position and/or orientation identified in the navigation control and/or docking assist parameters provided in block 404.

In some embodiments, controller 130 may be configured to provide navigation control and/or docking assist control signals (e.g., navigation control parameters provided by user interface 120 and/or controller 130) configured to evade a navigation hazard detected by perimeter ranging system 190 by maintaining or increasing a range to the navigation hazard and/or by decreasing the relative velocity of the navigation hazard towards mobile structure 101. In such embodiments, the navigation control and/or docking assist control signals may be configured to minimize deviation from the target linear and/or angular velocity, or to minimize deviation from the target docking track, while evading the navigation hazard.

Embodiments of the present disclosure can thus provide reliable and accurate docking assist for mobile structures. Such embodiments may be used to provide assisted and/or fully autonomous docking and/or navigation of a mobile structure and may assist in the operation of other systems, devices, and/or sensors coupled to or associated with the mobile structure, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to provide navigation control for a mobile structure and to communicate with a user interface and a perimeter ranging system mounted to the mobile structure, wherein the logic device is configured to:
receive navigation control parameters from the user interface and perimeter sensor data from the perimeter ranging system;
determine one or more navigation control signals configured to maneuver the mobile structure based, at least in part, on the received navigation control parameters and the received perimeter sensor data, wherein the one or more navigation control signals comprises a collision avoidance thruster or velocity demand; and
provide the one or more navigation control signals to a navigation control system for the mobile structure;
wherein the determining the one or more navigation control signals comprises:
determining one or more projected collision detection areas for the mobile structure within a two dimensional occupancy map, wherein each projected collision detection area corresponds to a test thruster or velocity demand; and
determining the collision avoidance thruster or velocity demand based, at least in part, on the one or more projected collision detection areas and the received perimeter sensor data, wherein the collision avoidance thruster or velocity demand is configured to cause the navigation control system to maneuver the mobile structure to minimize risk of collision with a navigation hazard identified in the perimeter sensor data;
wherein the determining the collision avoidance thruster or velocity demand comprises:
determining a projected collision risk estimation for each projected collision detection area; and
determining the collision avoidance thruster or velocity demand corresponding to the projected collision detection area that minimizes a thruster or velocity demand cost function based, at least in part, on minimizing the projected collision risk estimation and a deviation from a user demand contained in the received navigation control parameters.

2. The system of claim 1, wherein determining the projected collision risk estimation for each projected collision detection area comprises:
identifying projected collision detection voxels of the projected collision detection area that are also obstacle voxels corresponding to a navigation hazard identified in the perimeter sensor data, and
determining the projected collision risk estimation based, at least in part, on a simple count of overlapping projected collision detection voxels and obstacle voxels and/or a weighted count of overlapping projected collision detection voxels and obstacle voxels, the projected collision risk estimation being defined by the simple count and/or the weighted count.

3. The system of claim 2, wherein:
the one or more projected collision detection areas are a plurality of the projected collision detection areas, and each projected collision detection area corresponds to a projection time interval for all projected collision detection areas and a test thruster or velocity demand unique for each projected collision detection area; and
each projected collision detection area is determined by determining a set of positions and orientations of a virtual bumper polygon of the mobile structure at each discrete time within the projection time interval, and combining extents of the virtual bumper polygons by overlapping them within the 2D occupancy map.

4. The system of claim 2, wherein the cost function is defined as:

$$\text{cost}(\tau) = \alpha \|\tau - \tau_0\|_2 + \text{collision}(\tau)$$

wherein collision($\tau$) represents the projected collision risk estimation, and $\|\tau - \tau_0\|_2$ represents deviation from the user demand $\tau_0$.

5. The system of claim 2, wherein each overlapping voxel is weighted according to a distance to a nearest extent of the mobile structure, a measurement of how stationary the corresponding navigation hazard is, and/or other characteristics of the obstacle and/or motion of the mobile structure.

6. The system of claim 2, further comprising the user interface, wherein the logic device is configured to:
render a display view on the user interface for the mobile structure, wherein the display view comprises a chart comprising at least one of the projected collision detection areas and a virtual bumper polygon corresponding to the mobile structure.

7. The system of claim 2, wherein:
the projected collision risk estimation is implemented as the simple count; and
the navigation control parameters comprise user input provided to a user interface for the mobile structure for direct navigational control of the mobile structure, a target track for the mobile structure, and/or a target position and/or orientation for the mobile structure.

8. The system of claim 1, wherein the determining the one or more navigation control signals comprises:
determining a relative velocity of the navigation hazard disposed within a monitoring perimeter of the perimeter ranging system based, at least in part, on the received perimeter sensor data; and
determining the collision avoidance thruster or velocity demand based, at least in part, on the determined relative velocity of the navigation hazard, wherein the collision avoidance thruster or velocity demand is configured to cause the navigation control system to maneuver the mobile structure to minimize risk of collision with the navigation hazard.

9. The system of claim 1, wherein determining the one or more navigation control signals comprises:
determining wind and/or water current disturbances affecting navigation of the mobile structure based, at least in part, on the perimeter sensor data, the received navigation control parameters, and/or orientation and/or position data provided by orientation and/or position sensors coupled to the mobile structure; and
determining the collision avoidance thruster or velocity demand based, at least in part, on the determined wind and/or water current disturbances, wherein the collision avoidance thruster or velocity demand is configured to cause the navigation control system to compensate for the determined wind and/or water current disturbances while maneuvering the mobile structure to minimize risk of collision with the navigation hazard identified in the perimeter sensor data.

10. The system of claim 1, wherein:
the navigation control system comprises one or more of a steering actuator, a propulsion system, and/or a thrust maneuver system for the mobile structure; and
the navigation control signals are configured to evade the navigation hazard identified in the perimeter sensor data by maintaining or increasing a range to the navigation hazard and/or by decreasing a relative velocity of the navigation hazard towards the mobile structure and to minimize deviation from the navigation control parameters while evading the navigation hazard.

11. A method comprising:
receiving, by a logic device, navigation control parameters from a user interface for a mobile structure and perimeter sensor data from a perimeter ranging system mounted to the mobile structure;
determining, by the logic device, one or more navigation control signals based, at least in part, on the received navigation control parameters and the received perimeter sensor data, wherein the one or more navigation control signals comprises a collision avoidance thruster or velocity demand; and
providing, by the logic device, the one or more navigation control signals to a navigation control system for the mobile structure;
wherein the determining the one or more navigation control signals comprises:
determining one or more projected collision detection areas for the mobile structure within a two dimensional occupancy map, wherein each projected collision detection area corresponds to a test thruster or velocity demand; and
determining the collision avoidance thruster or velocity demand based, at least in part, on the one or more projected collision detection areas and the received perimeter sensor data, wherein the collision avoidance thruster or velocity demand is configured to cause the navigation control system to maneuver the mobile structure to minimize risk of collision with a navigation hazard identified in the perimeter sensor data;
wherein the determining the collision avoidance thruster or velocity demand comprises:
determining a projected collision risk estimation for each projected collision detection area; and
determining the collision avoidance thruster or velocity demand corresponding to the projected collision detection area that minimizes a thruster or velocity demand cost function based, at least in part, on minimizing the projected collision risk estimation and a deviation from a user demand contained in the received navigation control parameters.

12. The method of claim 11, wherein the determining the projected collision risk estimation for each projected collision detection area comprises:
identifying projected collision detection voxels of the projected collision detection area that are also obstacle voxels corresponding to a navigation hazard identified in the perimeter sensor data, and
determining the projected collision risk estimation based, at least in part, on a simple count of overlapping projected collision detection voxels and obstacle voxels and/or a weighted count of overlapping projected collision detection voxels and obstacle voxels, the projected collision risk estimation being defined by the simple count and/or the weighted count.

13. The method of claim 12, wherein:
the one or more projected collision detection areas are a plurality of the projected collision detection areas, and each projected collision detection area corresponds to a projection time interval for all projected collision detection areas and a test thruster or velocity demand unique for each projected collision detection area; and
each projected collision detection area is determined by determining a set of positions and orientations of a virtual bumper polygon of the mobile structure at each discrete time within the projection time interval, and combining extents of the virtual bumper polygons by overlapping them within the 2D occupancy map.

14. The method of claim 12, wherein the cost function is defined as:

$$\text{cost}(\tau) = \alpha \|\tau - \tau_0\|_2 + \text{collision}(\tau)$$

wherein collision ($\tau$) represents the projected collision risk estimation, and $\|\tau - \tau_0\|_2$ represents deviation from the user demand $\tau_0$.

15. The method of claim 12, wherein each overlapping voxel is weighted according to a distance to a nearest extent of the mobile structure, a measurement of how stationary the corresponding navigation hazard is, and/or other characteristics of the obstacle and/or motion of the mobile structure.

16. The method of claim 12, further comprising:
render a display view on a user interface for the mobile structure, wherein the display view comprises a chart comprising at least one of the projected collision detection areas and a virtual bumper polygon corresponding to the mobile structure.

17. The method of claim 12, wherein:
the projected collision risk estimation is implemented as the simple count; and
the navigation control parameters comprise user input provided to a user interface for the mobile structure for direct navigational control of the mobile structure, a target track for the mobile structure, and/or a target position and/or orientation for the mobile structure.

18. The method of claim 11, wherein the determining the one or more navigation control signals comprises:
determining a relative velocity of the navigation hazard disposed within a monitoring perimeter of the perimeter ranging system based, at least in part, on the received perimeter sensor data; and
determining the collision avoidance thruster or velocity demand based, at least in part, on the determined relative velocity of the navigation hazard, wherein the collision avoidance thruster or velocity demand is configured to cause the navigation control system to maneuver the mobile structure to minimize risk of collision with the navigation hazard.

19. The method of claim 11, wherein the determining the one or more navigation control signals comprises:
determining wind and/or water current disturbances affecting navigation of the mobile structure based, at least in part, on the perimeter sensor data, the received navigation control parameters, and/or orientation and/or position data provided by orientation and/or position sensors coupled to the mobile structure; and
determining the collision avoidance thruster or velocity demand based, at least in part, on the determined wind and/or water current disturbances, wherein the collision avoidance thruster or velocity demand is configured to cause the navigation control system to compensate for the determined wind and/or water current disturbances while maneuvering the mobile structure to minimize risk of collision with the navigation hazard identified in the perimeter sensor data.

20. The method of claim 11, wherein:

the navigation control system comprises one or more of a steering actuator, a propulsion system, and/or a thrust maneuver system for the mobile structure; and the navigation control signals are configured to evade the navigation hazard identified in the perimeter sensor data by maintaining or increasing a range to the navigation hazard and/or by decreasing a relative velocity of the navigation hazard towards the mobile structure and to minimize deviation from the navigation control parameters while evading the navigation hazard.

\* \* \* \* \*

UNITED STATES PATENT AND TRADEMARK OFFICE
CERTIFICATE OF CORRECTION

| | | |
|---|---|---|
| PATENT NO. | : 12,205,473 B2 | Page 1 of 1 |
| APPLICATION NO. | : 17/155048 | |
| DATED | : January 21, 2025 | |
| INVENTOR(S) | : Jean-Luc Kersulec and Mark Johnson | |

It is certified that error appears in the above-identified patent and that said Letters Patent is hereby corrected as shown below:

In the Specification

In the DETAILED DESCRIPTION:

Column 1, Lines 11-12, change "U.S. Patent Application Ser. No." to --U.S. Patent Application No.--.

Column 1, Lines 15-16, change "U.S. Patent Application Ser. No." to --U.S. Patent Application No.--.

Column 1, Lines 33-34, change "U.S. Patent Application Ser. No." to --U.S. Patent Application No.--.

Column 1, Line 37, change "U.S. Patent Application Ser. No." to --U.S. Patent Application No.--.

Column 1, Lines 54-55, change "U.S. Patent Application Ser. No." to --U.S. Patent Application No.--.

Column 1, Lines 57-58, change "U.S. Patent Application Ser. No." to --U.S. Patent Application No.--.

Column 9, Line 36, change "velocities/Client accelerations and/or linear" to --velocities/ accelerations and/or linear--.

Column 11, Line 5, change "dashed line 136 in FIG. 1), and/or" to --dashed line 136 in Fig. 1C), and/or--.

Column 30, Line 29, change "where τω is the demand" to --where $\tau u$ is the demand--.

Column 30, Line 9, change "where x(t) = $[x_b, y_b, \psi, \dot{x}_b, \dot{y}_b, \psi]^T$" to --where $x(t) = [x_b, y_b, \psi, \dot{x}_b, \dot{y}_b, \psi]^T$--.

Column 30, Line 29, change "τ(t) = $[\tau_u \tau_v, \tau_\omega]^T$" to --$\tau(t) = [\tau_u \tau_v, \tau_\omega]^T$--.

Column 30, Line 31, change "In general, f may be configured" to --In general, $f$ may be configured--.

Signed and Sealed this
Fifteenth Day of April, 2025

Coke Morgan Stewart
*Acting Director of the United States Patent and Trademark Office*